United States Patent
Kushibiki et al.

(10) Patent No.: US 8,535,846 B2
(45) Date of Patent: Sep. 17, 2013

(54) FUEL CELL

(75) Inventors: Keiko Kushibiki, Fujisawa (JP); Tatsuya Yaguchi, Yokosuka (JP); Shigeo Ibuka, Ebina (JP); Hirokazu Komatsu, Yokohama (JP); Yasushi Nakajima, Kawasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1299 days.

(21) Appl. No.: 11/562,034

(22) Filed: Nov. 21, 2006

(65) Prior Publication Data

US 2007/0154753 A1    Jul. 5, 2007

(30) Foreign Application Priority Data

Nov. 22, 2005   (JP) ................... 2005-337230

(51) Int. Cl.
  *H01M 8/02* (2006.01)
  *H01M 8/04* (2006.01)
  *H01M 8/24* (2006.01)

(52) U.S. Cl.
  USPC ............ 429/465; 429/452; 429/466; 429/497

(58) Field of Classification Search
  USPC ................. 429/30–32, 34–39, 452, 465–466, 429/479, 497
  See application file for complete search history.

(56) References Cited

U.S. PATENT DOCUMENTS

| | | | |
|---|---|---|---|
| 5,116,696 A | 5/1992 | Barp | |
| 5,219,673 A | 6/1993 | Kaun | |
| 5,330,858 A | 7/1994 | Shundou et al. | |
| 5,939,219 A * | 8/1999 | Jansing et al. | 429/32 |
| 6,140,266 A * | 10/2000 | Corrigan et al. | 502/439 |
| 6,344,290 B1 | 2/2002 | Bossel | |
| 6,403,247 B1 * | 6/2002 | Guthrie et al. | 429/34 |
| 7,041,406 B2 | 5/2006 | Schuler et al. | |
| 7,258,944 B2 | 8/2007 | Tsunoda | |
| 2002/0076592 A1 * | 6/2002 | Sato et al. | 429/26 |
| 2002/0177025 A1 * | 11/2002 | Kushibiki et al. | 429/30 |
| 2003/0054215 A1 * | 3/2003 | Doshi et al. | 429/26 |
| 2004/0043267 A1 | 3/2004 | Schuler et al. | |
| 2004/0058228 A1 * | 3/2004 | Shibata et al. | 429/44 |
| 2004/0219403 A1 * | 11/2004 | Champion et al. | 429/17 |
| 2004/0258977 A1 * | 12/2004 | Frank et al. | 429/35 |
| 2005/0181265 A1 * | 8/2005 | Clauss | 429/38 |
| 2006/0024534 A1 | 2/2006 | Nakajima et al. | |

FOREIGN PATENT DOCUMENTS

| | | |
|---|---|---|
| CN | 1445877 A | 10/2003 |
| CN | 1666367 A | 9/2005 |
| CN | 1692521 A | 11/2005 |
| DE | 42 17 891 A1 | 12/1992 |

(Continued)

*Primary Examiner* — Jonathan Crepeau
*Assistant Examiner* — Jacob Buchanan
(74) *Attorney, Agent, or Firm* — Foley & Lardner LLP

(57) ABSTRACT

A fuel cell includes a stack structure composed of fuel cell units with current collectors between the fuel cell units, a casing housing the stack structure, and a gas flow-regulating member provided in a gap between the casing and the stack structure. The fuel cell unit includes: a cell plate which holds at least one cell and has a gas introduction hole for one of fuel gas and air; and a separator plate which has a gas introduction hole for the one of the fuel gas and the air. The casing introduces the other of the fuel gas and the air via a gas introduction portion and flows the other gas to a gas discharge portion. The gas flow-regulating member guides the other gas to the gas discharge portion through the current collectors.

21 Claims, 24 Drawing Sheets

(56) References Cited

FOREIGN PATENT DOCUMENTS

| | | |
|---|---|---|
| EP | 0 437 175 A1 | 7/1991 |
| EP | 0 580 918 A1 | 2/1994 |
| JP | 2004-207028 A | 7/2004 |
| WO | WO 2004/059771 A2 * | 7/2004 |
| WO | WO 2005109557 A1 * | 11/2005 |

* cited by examiner

FUEL CELL

BACKGROUND OF THE INVENTION

1. Field of the Invention

The present invention relates to a fuel cell composed by housing, in a casing, a stack structure formed by stacking a plurality of solid oxide fuel cell units on one another.

2. Description of the Related Art

Heretofore, as a fuel cell including a stack structure formed by stacking a plurality of solid oxide fuel cell units, there is one disclosed in U.S. Pat. No. 6,344,290.

In the case of this fuel cell, both gases which are fuel gas and air are supplied thereto from center portions of cell plates and to be discharged from outer peripheral portions of the cell plates. Accordingly, unburned gas cannot be collected. As a result, when a gas flow is changed at such a time when the fuel cell is under transient operation, a fuel utilization drops to decrease a coefficient thereof. In addition, combustion of the fuel in the outer peripheral portions becomes unstable. Therefore, there is an apprehension that a local thermal stress is applied to each cell, causing a breakage thereof.

In this connection, as a fuel cell composed in order to solve such an apprehension as described above, there is one described in Japanese Patent Unexamined Publication No. 2004-207028.

SUMMARY OF THE INVENTION

In the fuel cell described in Japanese Patent Unexamined Publication No. 2004-207028, current collectors are arranged between solid oxide fuel cell units stacked on one another, and the current collectors and the cells are brought into contact with each other. Accordingly, generated power can be extracted from the fuel cell efficiently. However, when there is a gap between a casing and a stack structure, the gases flow through the gap more than through a portion of the current collectors. Therefore, there has been a problem that it becomes difficult for the gasses to reach the cells, which may cause a situation where sufficient generated power cannot be obtained.

Moreover, the fuel cell described above includes a stack structure composed by fastening the respective center portions of the plurality of fuel cell units stacked on one another. Accordingly, the respective outer peripheral edges of the fuel cell units are not fixed, and are placed in a free state. Therefore, the fuel cell has a less breakable construction against thermal shock caused by quick heating and the like. However, when mechanical vibrations are applied entirely to the fuel cell as in the case where the fuel cell is mounted on a vehicle, there has been an apprehension that the respective outer peripheral edges of the fuel cell units vibrate resonantly to apply a mechanical stress to the cells, causing a malfunction such as a crack.

The present invention has been made in consideration for the problems as described above inherent in the related art. It is an object of the present invention to provide a fuel cell which is, even if there is a gap between the casing and the stack structure, capable of obtaining sufficient generated power, and in addition, capable of enhancing durability thereof against the mechanical vibrations.

According to one aspect of the present invention, there is provided a fuel cell including: a stack structure composed by stacking a plurality of solid oxide fuel cell units with current collectors, each of the fuel cell unit including: a cell plate which holds at least one cell and has a gas introduction hole for one of fuel gas and air in a center portion thereof; and a separator plate which has a gas introduction hole for the one of the fuel gas and the air in a center portion thereof and makes an outer peripheral edge thereof entirely bonded to an outer peripheral edge of the cell plate; a casing housing the stack structure, the casing including a gas introduction portion and a gas discharge portion, and the casing introducing the other of the fuel gas and the air thereinto from the gas introduction portion and flowing the other gas to the gas discharge portion; and a gas flow-regulating member provided in a gap between the casing and the stack structure in order to flow the other gas to the gas discharge portion through the current collectors located between the fuel cell units

BRIEF DESCRIPTION OF THE DRAWINGS

The invention will now be described with reference to the accompanying drawings wherein.

DETAILED DESCRIPTION OF THE PREFERRED EMBODIMENT

Figure 1A:
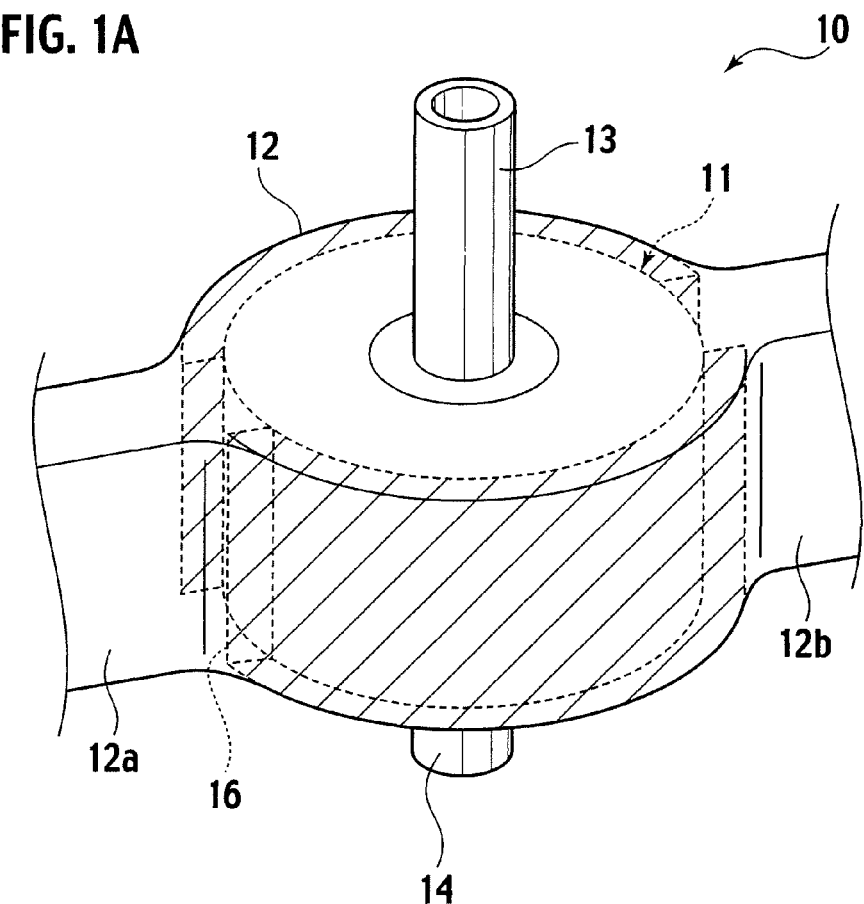
FIG. 1A is a perspective view showing an embodiment of a fuel cell according to the present invention.

Hereinafter, description will be made of embodiments of the present invention with reference to the drawings.

A fuel cell according to the present invention includes solid oxide fuel cell units. Each of the solid oxide fuel cell units includes a cell plate which holds a cell and has a gas introduction hole for one of fuel gas and air in a center portion thereof, and a separator plate which has a gas introduction hole for the one of the fuel gas and the air in a center portion thereof and makes an outer peripheral edge thereof bonded to an outer peripheral edge of the cell plate. Moreover, a plurality of the above-described fuel cell units are stacked on one another with current collectors, thereby forming a stack structure.

Moreover, the above-described fuel cell includes a casing. The casing includes a gas introduction portion and a gas discharge portion, and introduces the other of the fuel gas and the air thereinto from the gas introduction portion and flows the other gas to the gas discharge portion in a state of housing the stack structure therein.

In the above-described fuel cell, the one of the fuel gas and the air is supplied from the respective gas introduction holes of the cell plate and the separator plate into the fuel cell units. The one gas supplied into the fuel cell units may be discharged from centers of the units by forming gas discharge holes in the center portions of the fuel cell units, or may be discharged from outer peripheries of the units by forming notches for discharging the gas on outer peripheral edges of the fuel cell units.

Moreover, the present invention is characterized in that a gas flow-regulating member is provided in a gap between the casing and the stack structure in order to flow the other gas to the gas discharge portion through the current collectors located between the fuel cell units of the stack structure, the other gas being introduced into the casing from the gas introduction portion. With providing the gas flow-regulating member, it becomes easier for the other gas introduced from the gas introduction portion of the casing to flow through a portion of the current collectors between the fuel cell units stacked on one another in the stack structure than through the gap between the casing and the stack structure. Therefore, a supply amount of the other gas to the cells held by the cell plates will be increased to a great extent, resulting in that sufficient generated power can be obtained.

In the fuel cell of a type which discharges, from the outer peripheral edges of the fuel cell units, the one gas supplied into the fuel cell units, the discharge of the one gas from the gas discharge portion of the casing can be restricted by the gas flow-regulating member. Therefore, it becomes possible to prevent a backfire to the fuel cell units at a time when the fuel cell is under transient operation. As a result, it is possible to perform a stable operation, and it becomes possible to avoid a thermal shock.

Moreover, in the present invention, a thickness of the center portion of each fuel cell unit is made larger than a thickness of a region thereof where the cell is installed, thereby giving a function of a spacer to the center portion. Thus, between the stacked fuel cell units, flow passages through which the other of the fuel gas and the air is flown are formed.

Each fuel cell unit in the fuel cell according to the present invention is composed by bonding the respective outer peripheral edges of the cell plate and the separator plate to each other. Specifically, a step along the outer peripheral edge is provided in at least one of the cell plate and the separator plate, and thereafter, the outer peripheral edges are bonded to each other. Thus, between the cell plate and the separator plate, there is formed a space through which the one of the fuel gas and the air flows.

Note that, if the above-described steps are formed on both of the cell plate and the separator plate to establish symmetry therebetween, then it becomes possible to restrict a stress concentration. However, even if sizes of both of the steps are mutually changed, an improvement of strength of the cell plate and the separator plate, which may be brought by providing the steps, can be expected. Moreover, in the case of forming the step on one of the cell plate and the separator plate, a mounting area of the cell can be increased. As described above, it is possible to change the shapes of the cell plate and the separator plate in response to characteristics regarded as important, such as an improvement of thermal shock resistance and an improvement of an output density.

In the present invention, it is desirable that the steps provided on the cell plate and separator plate of the fuel cell unit be formed by press work. Furthermore, for bonding the respective outer peripheral edges of the cell plate and the separator plate to each other, not only welding and brazing can be used, but also ultrasonic bonding and the like can be used.

In the present invention, attachment positions of the cells of the fuel cell unit can be set in a region which forms a doughnut shape between the center portion and outer peripheral edge of the cell plate. One or more cells can be fixed into the region which forms the doughnut shape. For example, when the cell forms a small-diameter disc shape, it is desirable that the cells be arranged regularly around the center of the cell plate. Moreover, when the cell forms the doughnut shape, it is desirable that an inner ring and an outer ring, which have been subjected to the press work, be bonded to inner and outer peripheral edges of the cell, respectively. Moreover, the inner ring and the outer ring may be coupled to each other to form a frame shape, and it is also possible to attach cells of a sector shape to the frame.

Moreover, in the present invention, the stack structure is composed by stacking the plurality of fuel cell units, and gas seal bonding layers are interposed between the respective center portions of the fuel cell units stacked on one another. In this case, as the gas seal bonding layers, not only an inorganic bonding material such as a ceramic-based adhesive and a glass-based adhesive which have electrically insulating property can be used, but also a conductive bonding material mixed with a brazing material and metal powder, and gasket seal layers can be used, for example, when the cells form the doughnut shape.

Furthermore, in the stack structure, inter-unit current collectors are interposed between the respective cell regions of the fuel cell units. As the inter-unit current collectors, conductive porous bodies can be used. For example, not only metal mesh and foaming metal can be used, but also fabric and felt of fiber made of metal or an electrode material can be used.

Moreover, in a fuel cell of a type which discharges, from the centers of the fuel cell units, the one gas supplied into the fuel cell units, the stack structure is formed in such a manner that a flange, which includes an introduction pipe supplying the one gas into the fuel cell units, and a flange, which includes an exhaust pipe discharging the one gas from the fuel cell units, are installed on and under the stacked fuel cell units.

In the present invention, a plan shape of the fuel cell unit which forms the stack structure and an opening shape of the casing which houses the stack structure therein are not limited to the circular shape, and for example, may be a quadrangular shape, a polygonal shape, and a cloudy shape.

Moreover, when the stack structure and the casing form a cylindrical shape, the gas introduction portion and gas discharge portion of the casing can be arranged toward a side surface of the stack structure, and can be arranged toward upper and lower surfaces of the stack structure.

In the present invention, the number of stack structure housed in the casing is not limited to one, and a construction in which a plurality thereof are housed may be adopted. Moreover, the number of each of the gas introduction portion and gas discharge portion of the casing is not limited to one, and a plurality of each thereof can also be installed.

Moreover, for the above-described gas flow-regulating member, there can be used: an indefinite material which includes a castable refractory, fireproof foaming cement such as portland cement, alumina cement, phosphate cement, and silicate cement, fireproof mortar, gypsum, a ceramic adhesive, and bubble glass; and a sheet material or a molded body which includes felt, fabric, and knit which are mainly composed of glass fiber, ceramic fiber, and metal fiber, a composite material thereof, and metal foil. The gas flow-regulating member is not limited to any of the above.

Note that, for the purpose of improving thermal conductivity of the gas flow-regulating member and promoting heat radiation from the casing, the above-described gas flow-regulating member can be formed of a composite material obtained by mixing thereinto filler which is particulate, fibrous, chip-like, and so on, the filler being made of metal or ceramics, which is good in thermal conductivity.

Meanwhile, for the purpose of improving heat insulating performance of the gas flow-regulating member, restricting the heat radiation from the casing, and adjusting a porosity of the gas flow-regulating member, the gas flow-regulating member can also be composed of a porous body by mixing and molding thereinto an organic material and carbon filler, followed by firing.

Figure 8:
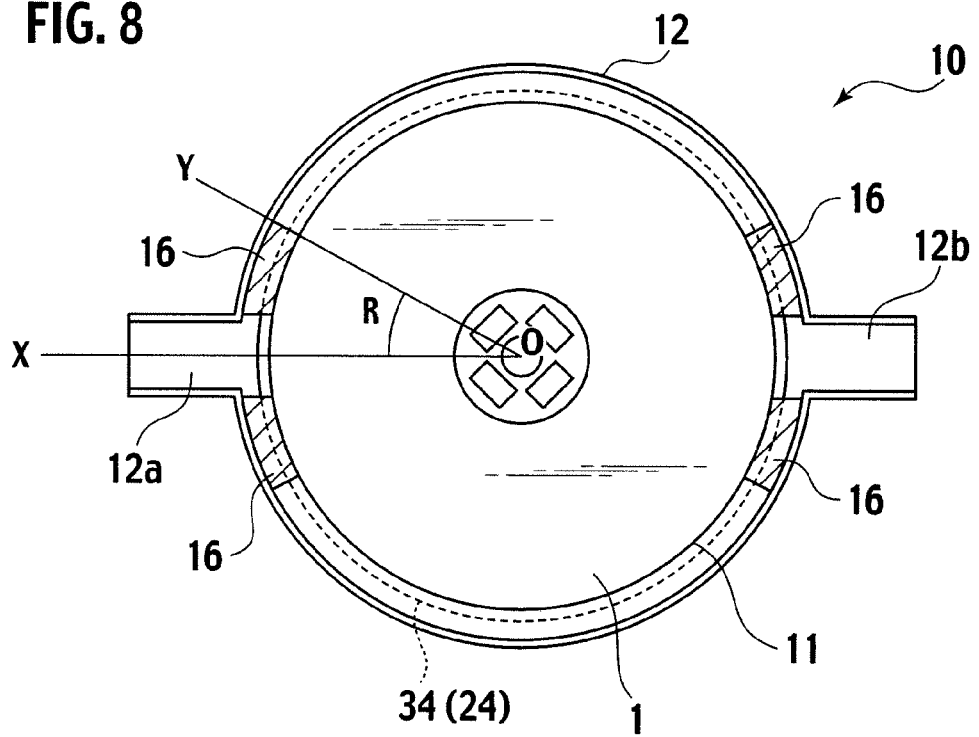
FIG. 8 is a plan view in a state where the upper surface of the casing and the uppermost current collector are removed, showing an arrangement example of a gas flow-regulating member in the fuel cell of FIG. 1A.

In the present invention, when the stack structure and the casing form a cylindrical shape, an installed position of the gas flow-regulating member depends on stack specifications such as the number of gas introduction portions and gas discharge portions of the casing, a ratio of an outer diameter of the fuel cell units and a diameter of the center portions thereof, an interval between the fuel cell units, opening widths of the gas introduction portion and gas discharge portion of the casing, a ratio in porosity of the inter-unit current collectors and the gas flow-regulating member, and an output density of the cells. Besides the above, the above-described installed position also depends on operation conditions such as a gas flow rate and an operation temperature. However, in the present invention, a construction can be adopted, in which the gas flow-regulating member is provided only in the vicinity of the gas introduction portion of the casing and the vicinity of the gas discharge portion thereof. In this case, as shown in FIG. 8, it is preferable that an angle R made by a line X-O which connects a center X of the gas introduction portion 12*a* (gas discharge portion) of the casing 12 and a center O of the fuel cell units 1 to each other and by a line O-Y which connects the center O of the fuel cell units 1 and a terminal end of the disposed gas flow-regulating member 16 be 15° or more. When the angle R is less than 15°, it sometimes happens that a large amount of gas flows through the gap between the casing 12 and the stack structure 11 to decrease a gas utilization, thereby deteriorating power generation efficiency. Note that, as a matter of course, the gas flow-regulating member 16 may be disposed over the entire periphery of the gap excluding the gas introduction portion 12*a* and the gas discharge portion 12*b*.

Moreover, in the present invention, a construction can be adopted, in which the gas flow-regulating member and the respective fuel cell units of the stack structure are mutually movably brought into contact with each other. When the gas flow-regulating member and the fuel cell units are completely adhered onto each other, distortion sometimes occurs in bonded portions thereof owing to a difference in thermal expansion coefficient between the materials constructing the respective members. However, if the above-described construction is adopted, it becomes easy for the fuel cell units to release a stress at the outer peripheral edges thereof against temperature rise and drop. As a result, the fuel cell units will improve the thermal shock resistance thereof and make themselves thinner. Further, a stack structure with a low heat capacity, which is excellent in starting easiness and responsiveness, can be obtained.

In the present invention, the gas flow-regulating member can be composed of a filler material injected or coated into the gap between the casing and the stack structure. In this case, if an oil-based material or a mold release agent is coated in advance on the fuel cell units side, then the filler material as the gas flow-regulating member can be disposed at a predetermined position without being adhered onto the fuel cell units. When such a construction is adopted, a gas supply amount to the portion of the cells is increased only by performing simple work, thereby improving the output density.

Moreover, the gas flow-regulating member can be composed of a molded body matched with a shape of the gap between the casing and the stack structure. In this case, for the molded body, the composite material of the indefinite material and the felt, the fabric, and the knit can be used. In a stacking step of the fuel cell units, while disposing the above-described molded body between the fuel cell units, other parts are stacked on one another, thereby forming the stack structure. The gas flow-regulating member is composed of the molded body matched with the shape of the gap between the casing and the stack structure, thus making it possible to constantly maintain the interval between the stacked fuel cell units. As a result, it is possible to evenly flow, through the respective layers of the fuel cell units, the gas introduced into the casing, and accordingly, the output density will be improved.

Furthermore, the above-described gas flow-regulating member can be composed by combining a sheet material located on the stack structure side and a filler material injected or coated onto the casing side. Moreover, the above-described gas flow-regulating member can be composed by combining the sheet material and the molded body matched with the shape of the gap between the casing and the stack structure. Furthermore, the above-described gas flow-regulating member can be composed by combining a spacer which is located on the stack structure side and capable of maintaining the interval between the fuel cell units and the filler material injected or coated onto the casing side.

When the gas flow-regulating member is composed by combining the sheet material located on the stack structure side and the filler material injected or coated onto the casing side, a felt sheet which mainly contains ceramic fiber as a main component can be disposed as the sheet material between the filler material and the stack structure. Thus, the filler material and the fuel cell units are inhibited from being adhered and fused to each other, and the thermal shock resistance of the fuel cell units will be improved. Moreover, in this case, as the sheet material, there can be disposed ceramic felt, metal foil, and the like which wrap the peripheries of the inter-unit current collectors. With such a construction, at the time when the filler material is injected or coated, it is possible to inhibit the filler material from entering pores of the current collectors.

Meanwhile, when the gas flow-regulating member is composed by combining the sheet material and the molded body matched with the shape of the gap between the casing and the stack structure, the sheet material to which the molded body is bonded can be formed so as to be wrapped around the stack structure and to be housed in the casing. Thus, it becomes possible to simply form the gas flow-regulating member and to simply install the gas flow-regulating member onto the stack structure.

Moreover, when the gas flow-regulating member is composed by combining the spacer capable of maintaining the interval between the fuel cell units and the filler material, the gas flow-regulating member can be formed of a wavy thin plate as the spacer for constantly maintaining the inter-unit interval and of the filler material. In this case, it is possible to maintain the interval between the fuel cell units. Accordingly, it becomes possible to prevent the peripheral edge portions of the fuel cell units from resonating to a large extent against the mechanical vibrations of the fuel cell. Hence, excellent durability is brought to the fuel cell.

In the present invention, a construction can be adopted, in which a porosity of the gas flow-regulating member is set smaller than a porosity of the current collectors located between the fuel cell units. When such a construction is adopted, the supply amount of the other of the fuel gas and the air to the cells of the fuel cell units will be further increased. Specifically, when the fuel cell is steadily operated in an operation mode with a large heat generation amount, such as a time of a high-load operation, a construction can be adopted, in which an air flow passage for cathodes are provided on the outside of the casing, the introduced air is preheated, and the stack structure is cooled. In this case, the porosity of the gas flow-regulating member is reduced, and thus heat transfer from the stack structure to the casing is promoted, and the heat can be radiated effectively to the outside of the casing. Moreover, for the purpose of promoting the heat transfer from the stack structure to the casing, and for the purpose of promoting heat transfer from the casing, the gas flow-regulating member can be composed of the composite material obtained by mixing thereinto the filler of the metal or the ceramics, which is excellent in thermal conductivity.

Moreover, in the present invention, a construction can be adopted, in which the porosity of the gas flow-regulating member is partially changed. Specifically, in the gas flow-regulating member, a region in which the thermal conductivity is high, weight is large, and the porosity is small is restricted to the minimum necessary. Thus, a weigh reduction and a heat capacity reduction in the fuel cell will be achieved. In addition, since the heat radiation from the casing is restricted, thus making it possible to improve the heat insulating performance thereof. Accordingly, it becomes easy to keep the stack structure warm, and the power generation efficiency will be improved.

Figure 20:
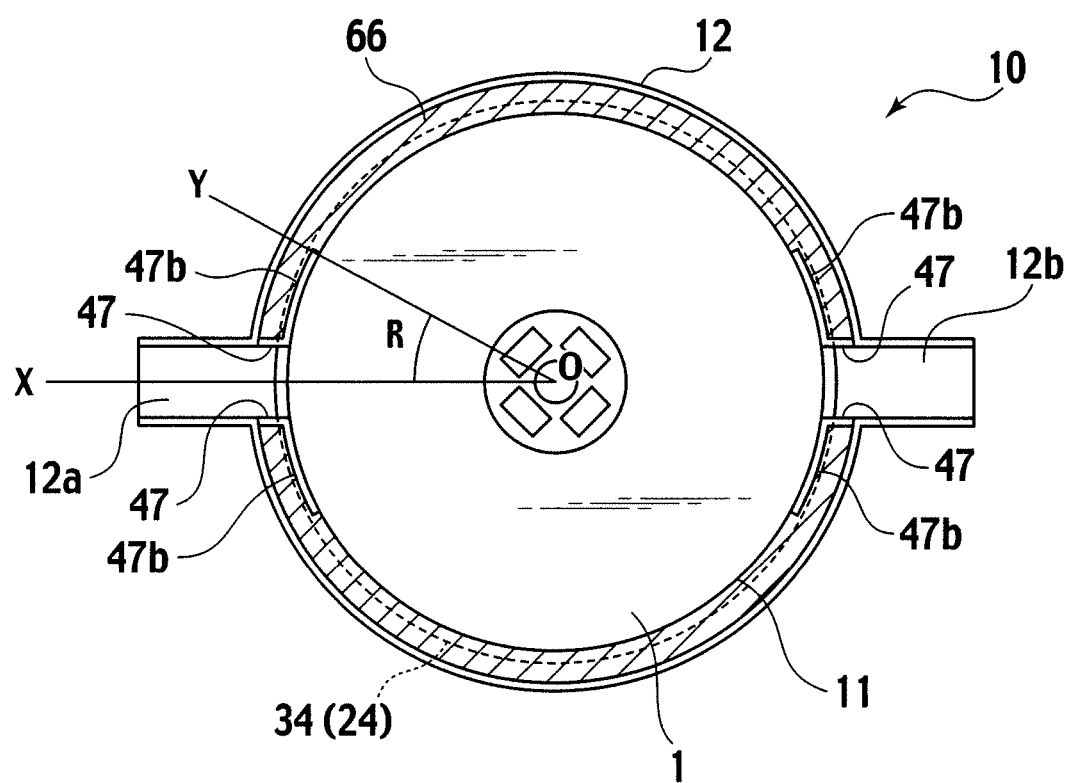
FIG. 20 is a plan view in a state where the upper surface of the casing and the uppermost current collector are removed, showing another modification example of the fuel cell in FIG. 16A.

In this case, it is preferable to adopt a construction in which a porosity of a portion of the gas flow-regulating member, which is located on the casing side, is set larger than a porosity of a portion thereof located on the stack structure side. For example, as shown in FIG. 20, baffle members 47b, which have a small porosity, are arranged in the vicinity of the gas introduction portion 12a of the casing 12 and the vicinity of the gas discharge portion 12b thereof. Further, the angle R made by the line X-O which connects the center X of the gas introduction portion 12a (gas discharge portion 12b) and the center O of the fuel cell units to each other and by the line O-Y which connects the center O of the fuel cell units 1 and a terminal end of the baffle members 47b of the gas flow-regulating member to each other is set to at least 15°. Moreover, the baffle members 47b with the small porosity are brought into contact with the inter-unit current collectors 15, and a partition wall 47 including the baffle member 47b is made to face the gas introduction portion 12a (gas discharge portion 12b).

Moreover, as described above, when the gas flow-regulating member is composed by combining the sheet material located on the stack structure side and the filler material injected or coated on the casing side, a member with a small porosity, such as a ceramic felt sheet, metal foil, and metal mesh, can be used for the sheet material. In this case, the porosity of the filler material can be increased, and the improvement of the heat insulating performance and the weight reduction will be achieved. In addition, cracks are difficult to enter the filler material against the thermal shock, and even if the cracks enter, a decrease of the gas flow regulating performance will be avoided.

Furthermore, as described above, when the gas flow-regulating member is composed of the molded body matched with the shape of the gap between the casing and the stack structure, the ceramic-based adhesive is coated on an outer peripheral surface of the molded body, followed by solidification, thereby forming a dense surface layer with a small porosity. Then, the weight reduction and the heat capacity reduction will be achieved.

Moreover, as such a construction in which the porosity of the gas flow-regulating member is partially changed, a construction can be adopted, in which a member formed by coating the filler material onto the sheet material is wrapped around the periphery of the stack structure, the above-described member is solidified, and then the stack structure is housed in the casing. In this case, for example, if a member formed by patterning plural layers of the filler materials different in porosity from each other on the sheet material and coating the filler materials thereon, then it becomes possible to simply control the porosity of the gas flow-regulating member. As described above, if the filler materials different in porosity from each other are stacked into desired patterns by a printing technology, then it becomes possible to cope with a complicated peripheral shape of the stack structure.

Furthermore, as such a construction in which the porosity of the gas flow-regulating member is partially changed, a construction can be adopted, in which a molded body and a filler material each of which has a large porosity are arranged on the outside of a molded body and a filler material each of which has a small porosity. In this case, the heat radiation from the casing is restricted, thus making it easy to keep the stack structure warm. As a result, the power generation efficiency will be improved.

In the present invention, the peripheral edge portions of the members which construct the fuel cell units, such as the separator plates and the cell plates, can be formed of a conductive material such as metal. In this case, it is desirable that an electrically insulating layer be disposed on a portion of the gas flow-regulating member, which is brought into contact with at least the fuel cell units. Further, it is desirable that an electrically insulating treatment be implemented for the portion of the gas flow-regulating member, which is brought into contact with the fuel cell units. As described above, when the construction in which the gas flow-regulating member and the fuel cell units are electrically insulated from each other is adopted, it becomes possible to improve electrically insulating property between the fuel cell units or between the fuel cell units and the casing through the gas flow-regulating member. As a result, a leakage loss is restricted, leading to the improvement of the power generation efficiency.

As the above-described electrically insulating layer, an electrically insulating sheet of felt, fabric, or knit, which is mainly formed of glass fiber or ceramic fiber, can be used. In this case, the one obtained by forming a ceramic adhesive layer on either surface of front and back of the insulating sheet, followed by solidification, can be located thereon, and on the surface, a glass coating layer, an enamel layer, and the like can be formed. In addition, as the filler material, a material can be used, which is superior in property such as quick drying property and porosity controllability though inferior in electrically insulating property at a high temperature.

In the present invention, a construction can be adopted, in which a casing side portion of the current collectors located between the fuel cell units is formed as the gas flow-regulating member capable of maintaining the interval between the fuel cell units, and the electrically insulating member is interposed between the gas flow-regulating member and the fuel cell units. Specifically, for the porous current collectors, the gas flow-regulating members with a small porosity are formed in advance. Then, at the time of the stacking step of the fuel cell units, while the electrically insulating layers are being arranged on the front and back of each gas flow-regulating member as the current collector, the fuel cell units are stacked on one another with the current collectors interposed therebetween, thereby forming the stack structure. Thereafter, the stack structure is housed in the casing. In this case, it is possible to easily maintain the interval between the fuel cell units, and accordingly, assembly work of the fuel cell becomes easy.

In the present invention, a partition member can be provided on the gas introduction portion and an end surface of the gas flow-regulating member adjacent to the gas introduction portion. Further, the partition member can be provided on the gas discharge portion and an end surface of the gas flow-regulating member adjacent to the gas discharge portion. Thus, when the gas flow-regulating members are formed of the filler material or the molded body, it becomes possible to avoid that the gas flow-regulating members will hang out to the gas introduction portion and the gas discharge portion, thereby hindering the flow of the gas.

Moreover, partition walls can be provided as the partition members. Furthermore, on the partition wall on the gas introduction portion side, first baffle members can be provided integrally therewith. The first baffle members flow, to the current collectors between the fuel cell units, the other gas introduced from the gas introduction portion. In addition, on the partition wall on the gas discharge portion side, second baffle members can be provided integrally therewith. The second baffle members guide, to the gas discharge portion, the other gas having passed through the current collectors. In this case, it becomes possible to easily distinguish the gas introduction portion and the gas discharge portion, of which pressure losses are desired to be reduced, an the region with a small porosity, of which pressure loss is desired to be increased.

In the present invention, a positioning/holding structure which locates and holds the stack structure at a predetermined region in the casing can be provided in the casing. The positioning/holding structure can be formed on a part of the casing. The positioning/holding structure can be formed on an entirety of the casing. Alternatively, the positioning/holding structure can be formed to every plural fuel cell units of the stack structure.

Specifically, the positioning/holding structure can be composed of ratchet-like steps, wavy steps, and wedge-shaped grooves. Moreover, when the casing and the stack structure form the cylindrical shape, the positioning/holding structure can be formed of notches provided at appropriate positions of the casing. As described above, when the positioning/holding structure is provided in the casing, it is possible to inhibit the peripheral edge portions of the fuel cell units from resonating to a large extent owing to the mechanical vibrations of the fuel cell. Hence, excellent durability is brought.

A description will be made below in more detail of the present invention based on embodiments. However, the present invention is not limited to the embodiments to be described below.

FIG. 1A to FIG. 4A show an embodiment of the fuel cell according to the present invention. As shown in FIG. 1A to FIG. 1C, a fuel cell 10 includes a stack structure 11 composed by stacking a plurality of solid oxide fuel cell units 1 with current collectors 15. Moreover, the fuel cell 10 includes a casing 12 which forms a cylindrical shape. The casing 12 includes a gas introduction portion 12$a$ and a gas discharge portion 12$b$. In the casing 12, the air is introduced from the gas introduction portion 12$a$ and then flows to the gas discharge portion 12$b$ in a state where the stack structure 11 is housed therein.

Figure 2:
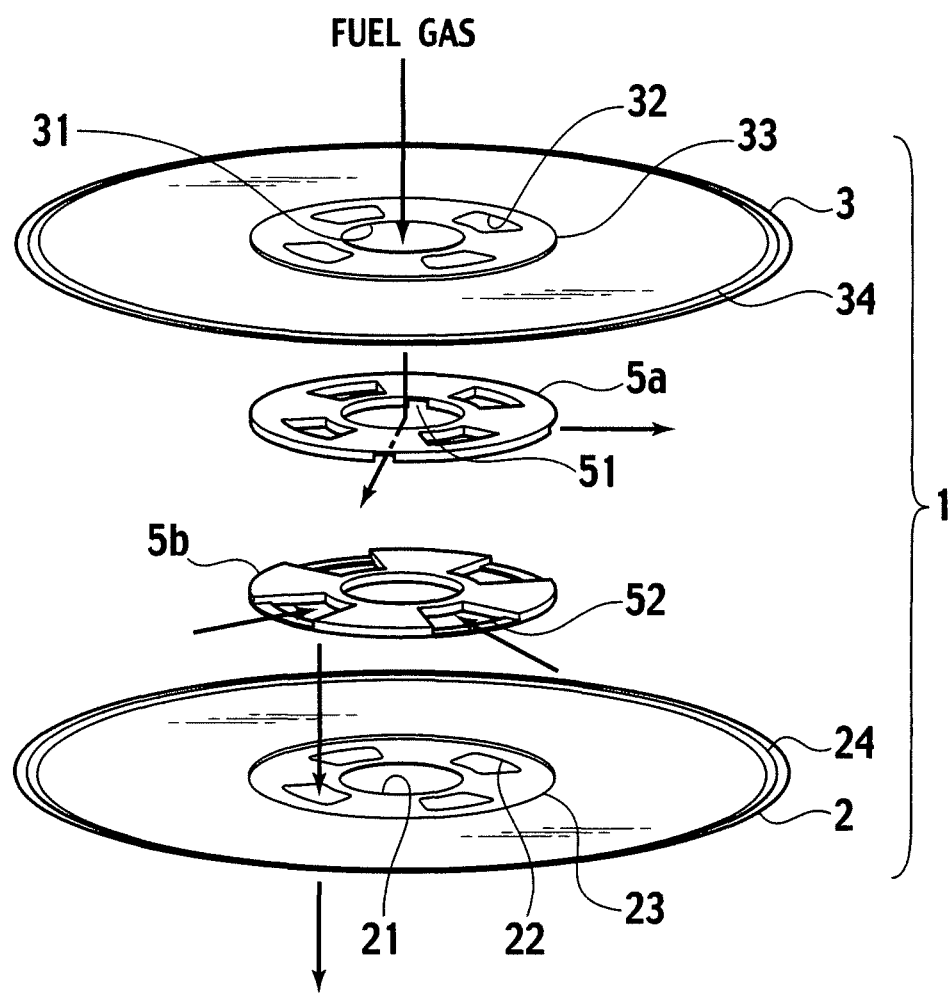
FIG. 2 is an exploded perspective view showing a fuel cell unit constructing a stack structure of the fuel cell in FIG. 1A.
Figure 3:
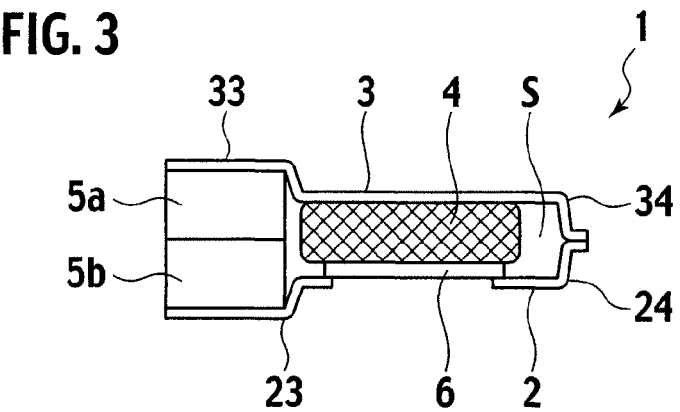
FIG. 3 is a partial cross-sectional view showing the fuel cell unit of the fuel cell in FIG. 1A.

As shown in FIG. 2, the fuel cell unit 1 includes a metal-made cell plate 2 which forms a disc-like thin plate shape and has a gas introduction hole 21 and gas discharge holes 22 in a center portion thereof. Further, the fuel cell unit 1 includes a metal-made separator plate 3 which forms a disc-like thin plate shape and has a gas introduction hole 31 and gas discharge holes 32 in a center portion thereof in the same way as the cell plate 2. Moreover, as shown in FIG. 3, the respective outer peripheral edges of the cell plate 2 and the separator plate 3 are bonded to each other in a state where the cell plate 2 and the separator plate 3 are opposed to each other. In a bag portion (space) S formed between the cell plate 2 and the separator plate 3, a current collector 4 is housed.

As also shown in FIG. 2 and FIG. 3, in the center portions of the cell plate 2 and the separator plate 3, circular projected step portions 23 and 33 are formed by press work, respectively. The step portions 23 and 33 form concentric shapes with the outer peripheral edges of the cell plate 2 and the separator plate 3, and protrude in a direction of being separated from each other, thereby functioning as spacers as will be described later. Moreover, in the outer peripheral edges of the cell plate 2 and the separator 3, annular steps 24 and 34 are formed by press work, respectively. The annular steps 24 and 34 form concentric shapes with the respective outer peripheral edges, and protrude in a direction of being approached to each other, thereby forming the space S. The gas introduction holes 21 and 31 and the gas discharge holes 22 and 32 are arranged in the respective step portions 23 and 33 of the cell plate 2 and the separator plate 3.

Figure 4A:
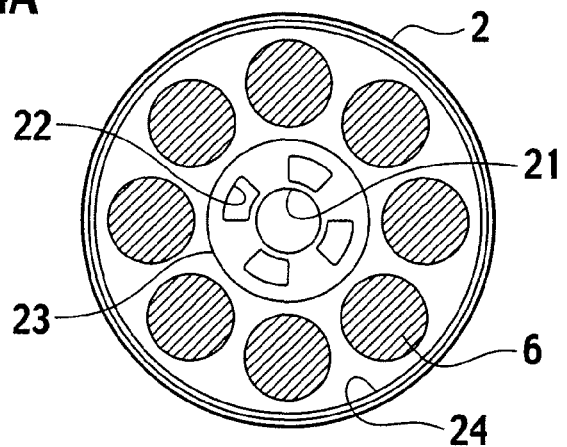
FIG. 4A is a plan view of a cell plate, showing an arrangement pattern of cells of the fuel cell in FIG. 1A.

As shown in FIG. 4A, onto a region which forms a doughnut shape between the center portion and outer peripheral edge of the cell plate 2, a plurality of cells 6 each of which forms a circular shape are fixed. Each cell 6 may be any of an electrolyte support type cell shown in FIG. 4B, an electrode support type cell shown in FIG. 4C, and a porous material support type cell shown in FIG. 4D. Specifically, as the electrolyte support type cell, the one can be used, in which a cathode 6a and an anode 6c are provided on both surfaces of a solid electrolyte 6b, and the cathode 6a and the anode 6c are supported by the solid electrolyte 6b. Moreover, as the electrode support type cell, the one can be used, in which the solid electrolyte 6b and the cathode 6a are provided on the anode 6c, and the cathode 6a and the solid electrolyte 6b are supported by the anode 6c. Furthermore, as the porous material support type cell, the one can be used, in which the cathode 6a, the solid electrolyte 6b and the anode 6c are provided on a porous plate 6d, and the cathode 6a, the solid electrolyte 6b and the anode 6c are supported by the porous plate 6d.

Furthermore, as shown in FIG. 2, in the step portion 33 of the separator plate 3, there is housed a flow passage part 5a which includes a gas introduction flow passage 51 communicating with the gas introduction hole 31 and supplies fuel gas into the space S. Moreover, in the step portion 23 of the cell plate 2, there is housed a flow passage part 5b which includes a gas discharge flow passage 52 communicating with the gas discharge holes 22 and discharges the fuel gas from the space S. As will be described later, the flow passage parts 5a and 5b are brought into intimate contact with each other only by pressing force of the entire stack structure 11 in a state where the fuel cell units 1 are stacked on one another to form the stack structure 11.

In this embodiment, for each of the cell plate 2 and the separator plate 3, a rolled plate of stainless steel (SUS430) with a thickness of 0.1 mm is used. Then, the rolled plate is set on a press machine equipped with a superhard metal die made of die steel SKD11, and is applied with a press load of 80 tons, thereby being subjected to the press work.

An outer diameter of the cell plate 2 and the separator plate 3 which are obtained by the press work is 125 mm. Subsequently, the respective outer peripheral edges of the cell plate 2 and the separator plate 3 are bonded to each other by using laser welding, and the fuel cell unit 1 with a thickness of 1.5 mm is thus formed. Moreover, for the current collector 4 housed in the space S between the cell plate 2 and the separator plate 3, the one formed of a metal mesh made of Inconel is used, and a peripheral edge portion thereof is bonded to the cell plate 2 and the separator plate 3 by the laser welding.

Meanwhile, also for the flow passage parts 5a and 5b, the SUS430 is used. The flow passage parts 5a and 5b are fixed to the cell plate 2 and the separator plate 3 by diffused junction in vacuum, where a bonding temperature is set at 1000° C. or less, thereby being prevented from deformation at a time of the bonding thereof. Note that it is also possible to bond the flow passage parts 5a and 5b by laser welding using a YAG laser, in place of the diffused junction. In this case, each of the cell plate 2 and the separator plate 3 forms the thin plate shape, and accordingly, the flow passage parts 5a and 5b can be bonded to the cell plate 2 and the separator plate 3 also by irradiating the laser thereonto from surfaces of the cell plate 2 and the separator plate 3. Moreover, flow passage patterns of the flow passage parts 5a and 5b can be formed not only by etching, grinding processing and laser processing but also by stacking and bonding etching parts.

In this embodiment, the stack structure 11 is composed by stacking the above-described fuel cell units 1 to forty layers at an interval of 1.5 mm. Note that FIG. 1C shows the stack structure 11 while omitting the layers to five layers. Moreover, the plurality of stacked fuel cell units 1 are sandwiched vertically by flanges 13 and 14. Specifically, a plurality of stud bolts (not shown) are individually inserted into the plurality of gas discharge ports 22 and 32 formed around the respective gas introduction ports 21 and 31 of the cell plate 2 and the separator plate 3. Then, one end portion of each stud bolt is screwed into the upper flange 13. Simultaneously, a nut is screwed with a disc spring into the other end portion of each stud bolt, which protrudes outside from the lower flange 14. Thus, the fuel cell units 1 stacked on one another are fastened to one another. Note that the upper flange 13 includes an introduction pipe 13a for the fuel gas, and that the lower flange 14 includes an exhaust pipe 14a for the fuel gas.

In this case, between the respective center portions of the fuel cell units 1, a ceramic-based adhesive 17 as a seal bonding material is coated in a double-ring shape. Note that, as the seal bonding material, there can be used a glass-based adhesive and a gasket molded by adding ceramic fiber and filler to glass. Moreover, when the cells 6 form the doughnut shape as will be described later, it is possible to use a paste-like adhesive mixed with metal powder, a gasket-like brazing material, and a metal gasket.

In the fuel cell 10, the above-described stack structure 11 is enclosed by the SUS430-made casing 12 which is vertically split. The gas introduction portion 12a and the gas discharge portion 12b are individually welded to the casing 12, and the stack structure 11 is thus housed in the casing 12. In this case, in a gap between the stack structure 11 and the casing 12, a filler material 16 as a gas flow-regulating member made of fireproof foaming cement is provided. Thus, the air introduced from the gas introduction portion 12a is adapted to flow to the gas discharge portion 12b through the current collectors 15 located between the fuel cell units 1 in the stack structure 11.

In this embodiment, the filler material 16 is coated on an outer peripheral edge of the stack structure 11 before the stack structure 11 is housed in the casing 12. In this case, boron nitride as a mold release agent is sprayed in advance to the outer peripheral edge of the stack structure 11, thereby allowing a mutual movement between the filler material 16 and the stack structure 11.

Figure 1B:
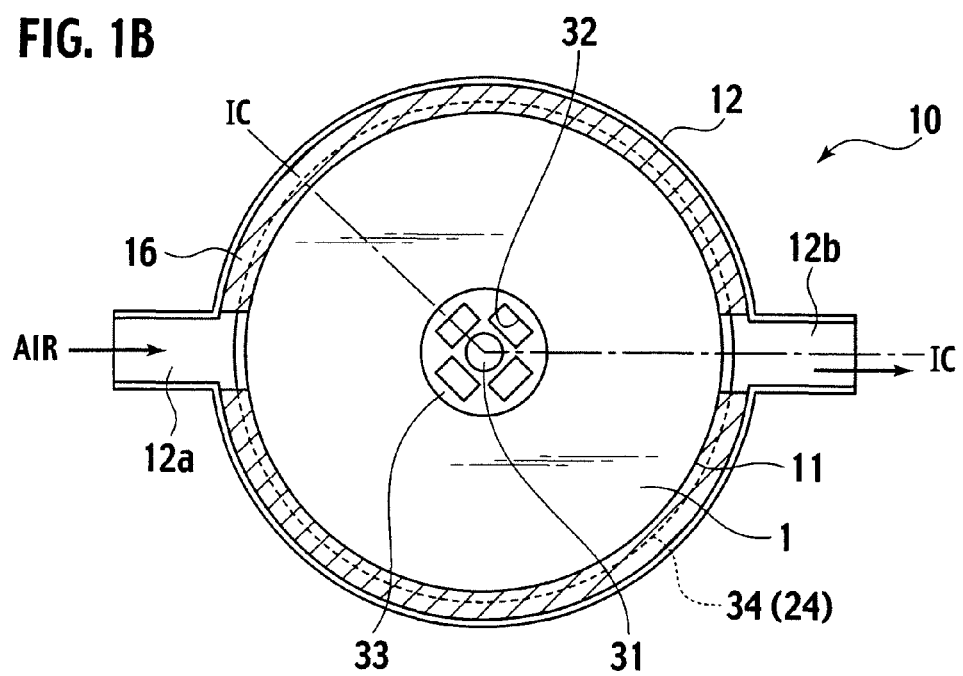
FIG. 1B is a plan view showing a state where an upper surface of a casing and an uppermost current collector are removed in the embodiment of the fuel cell according to the present invention.
Figure 1C:
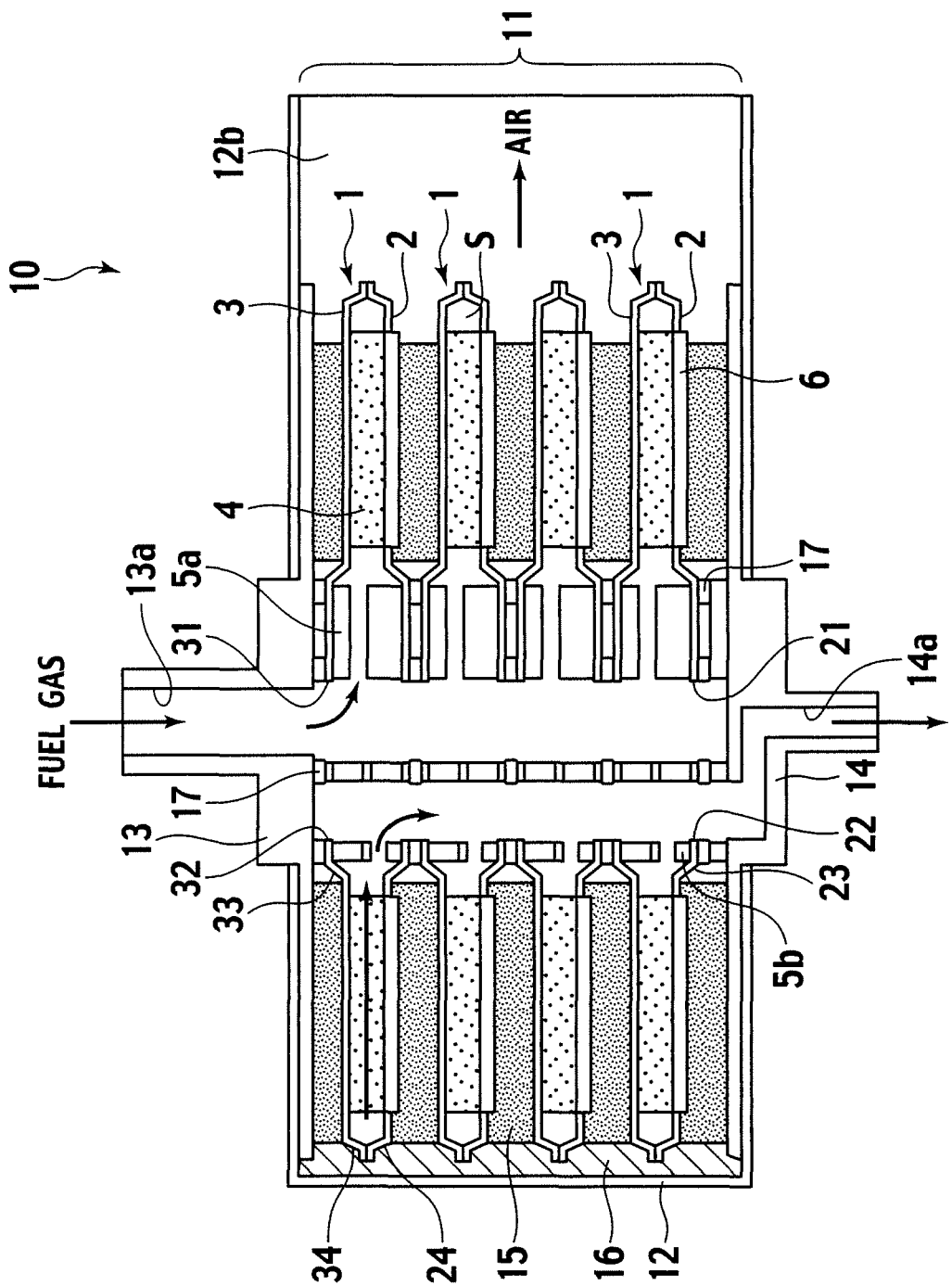
FIG. 1C is a cross-sectional view showing the fuel cell of FIG. 1A, taken along a line IC-IC of FIG. 1B.

In the fuel cell 10, when the air is introduced from the gas introduction portion 12a to the casing 12 as shown in FIG. 1A to FIG. 1C, the air flows between the fuel cell units 1 of the stack structure 11, that is, to the current collectors 15 located on the cathodes side. Then, the air is exhausted through the gas discharge portion 12b. Meanwhile, the fuel gas is introduced into the respective spaces S through the introduction pipe 13a of the flange 13 and the respective gas introduction holes 21 and 31 of the fuel cell units 1. Then, the fuel gas flows through the spaces S. Subsequently, the fuel gas is exhausted through the respective gas discharge holes 22 and 32 and the exhaust pipe 14a of the flange 14.

In the above-described fuel cell 10, the filler material 16 made of the foaming cement, which serves as the gas flow-regulating member, is provided in the gap between the stack structure 11 and the casing 12. Therefore, it becomes easier for the air introduced from the gas introduction portion 12a to flow through the current collectors 15 than through the gap between the casing 12 and the stack structure 11. Hence, an air supply amount to the cells 6 held by the cell plates 2 will be increased to a great extent, resulting in that sufficient generated power can be obtained.

Moreover, in the above-described fuel cell 10, the fuel gas is adapted to flow only through the spaces S each of which is formed between the cell plate 2 and separator plate 3 of the fuel cell unit 1, and accordingly, it is possible to collect unburned gas. Hence, even if the gas flow is changed at such a time when the fuel cell is under transient operation, a fuel utilization does not drop. In addition, there is a decreased possibility that a local thermal stress is applied to the cells 6, causing a malfunction thereof.

Furthermore, in the above-described fuel cell 10, the filler material 16 made of the foaming cement is coated on the outer peripheral edge of the stack structure 11, and the gas flow-regulating member is thus formed. In addition, the boron nitride as a mold release agent is sprayed in advance to the outer peripheral edge of the stack structure 11, and the surface treatment is thereby performed therefor. Therefore, the filler material 16 can be placed at a predetermined position without being adhered onto the fuel cell units 1. As a result, only by doing simple work, it becomes possible to increase a gas supply amount to the cells 6. In addition, it becomes easy for the fuel cell units 1 to release the stress by the outer peripheral edges thereof against temperature rise and drop, and the fuel cell units 1 improve thermal shock resistance thereof and make themselves thinner.

Figure 5:
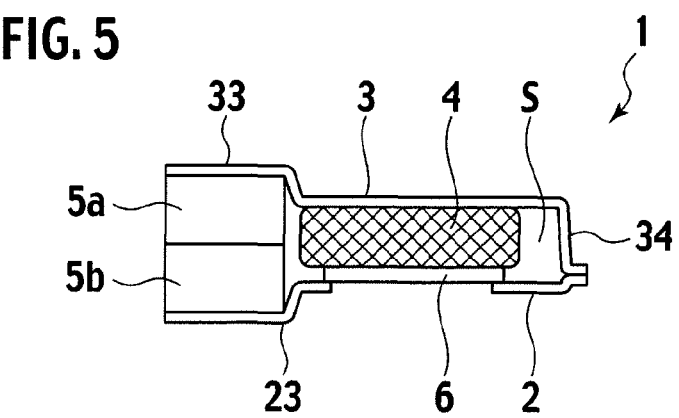
FIG. 5 is a partial cross-sectional view showing another construction of the fuel cell unit in the fuel cell of FIG. 1A.
Figure 4B:
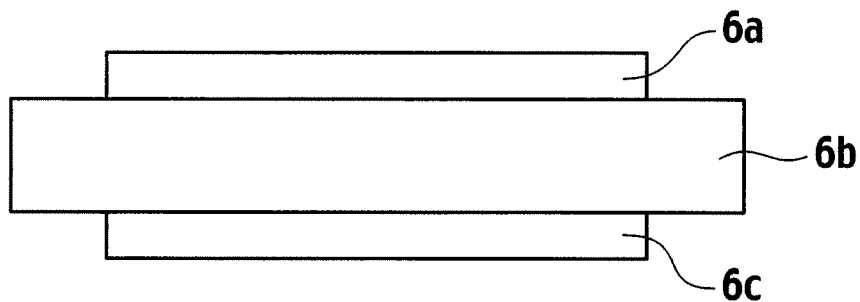
FIG. 4B is a cross-sectional view showing an example of an electrolyte support type cell.
Figure 4C:
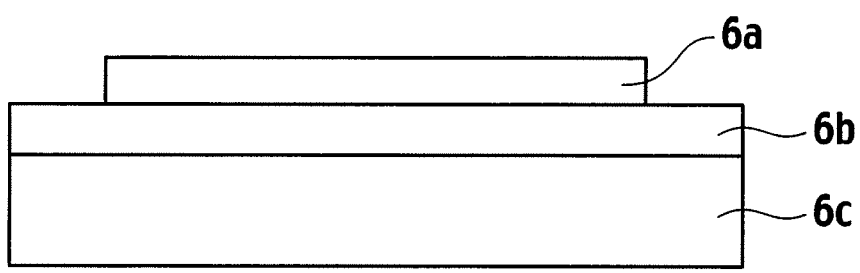
FIG. 4C is a cross-sectional view showing an example of an electrode support type cell.
Figure 4D:
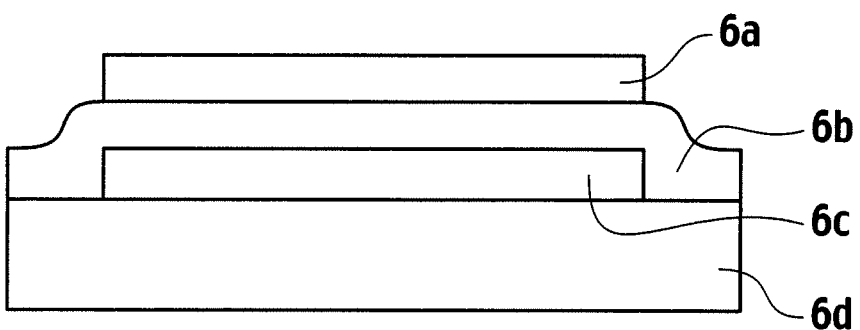
FIG. 4D is a cross-sectional view showing an example of a porous material support type cell.

In each of the fuel cell units 1 of this embodiment, the cell plate 2 and the separator plate 3 form mutually the same shape, however, the present invention is not limited to this. For example, as shown in FIG. 5, the cell plate 2 onto which the cell 6 is attached may form a shape only having the step portion 23, and the separator plate 3 may form a shape having the annular step 34 of which height is approximately double that in the casing of FIG. 3.

Figure 6A:
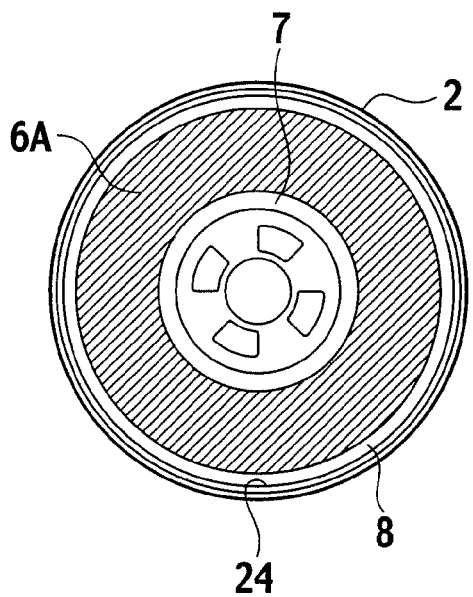
FIGS. 6A and 6B are plan view of cell plates, showing other arrangement patterns of the cells in the fuel cell of FIG. 1A.
Figure 6B:
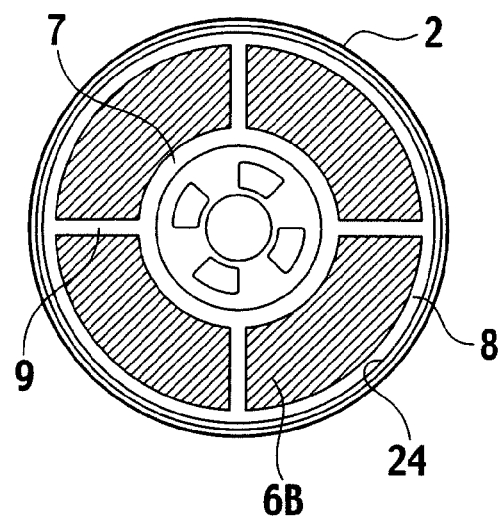

Moreover, this embodiment shows the casing where the cell 6 forms a small-diameter disc shape, however, the present invention is not limited to this. For example, when a cell 6A forms a doughnut shape as shown in FIG. 6A, an inner ring 7 and an outer ring 8, which have been subjected to the press work, can be bonded to inner and outer peripheral edges thereof, respectively. The inner ring 7 and the outer ring 8 can be bonded to the separator plate 3. In this case, as shown in FIG. 6B, the inner ring 7 and the outer ring 8 may be coupled to each other by bars 9 to form a frame in consideration for workability at the time of bonding. It is also possible to attach cells 6B of a sector shape to the frame.

Figure 7:
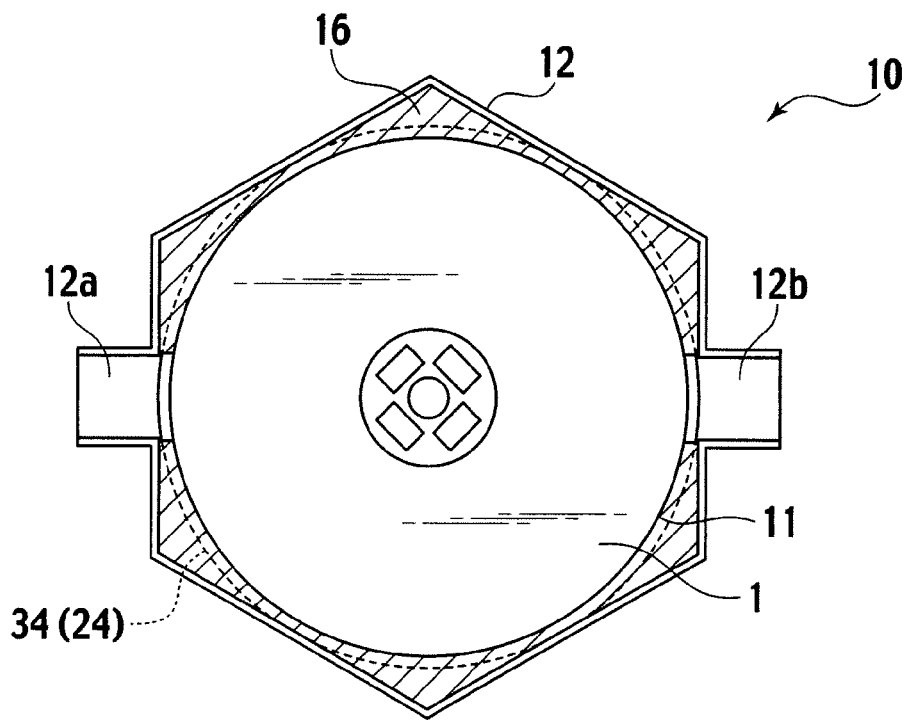
FIG. 7 is a plan view in a state where an upper surface of a casing and the uppermost current collector are removed, showing a modification example of the casing of the fuel cell in FIG. 1A.

This embodiment shows the casing where an opening shape of the casing 12 forms the circular shape, however, the present invention is not limited to this. For example, as shown in FIG. 7, the opening shape of the casing 12 may form a hexagonal shape.

Moreover, in this embodiment, the filler material 16 is disposed over the entire periphery excluding the gas introduction portion 12a and the gas discharge portion 12b in the gap between the casing 12 and the stack structure 11. However, the filler material 16 may be provided only in the vicinity of the gas introduction portion 12a and the vicinity of the gas discharge portion 12b in the gap. In this case, as shown in FIG. 8, it is preferable that an angle R made by a line X-O which connects a center X of the gas introduction portion 12a (gas discharge portion 12b) and a center O of the fuel cell units 1 to each other and by a line O-Y which connects the center O of the fuel cell units 1 and a terminal end of the disposed filler material 16 to each other be 15° or more. When the angle R is less than 15°, it sometimes happens that a large amount of the gas flows through the gap between the casing 12 and the stack structure 11 to decrease a gas utilization, thereby deteriorating power generation efficiency.

Figure 9:
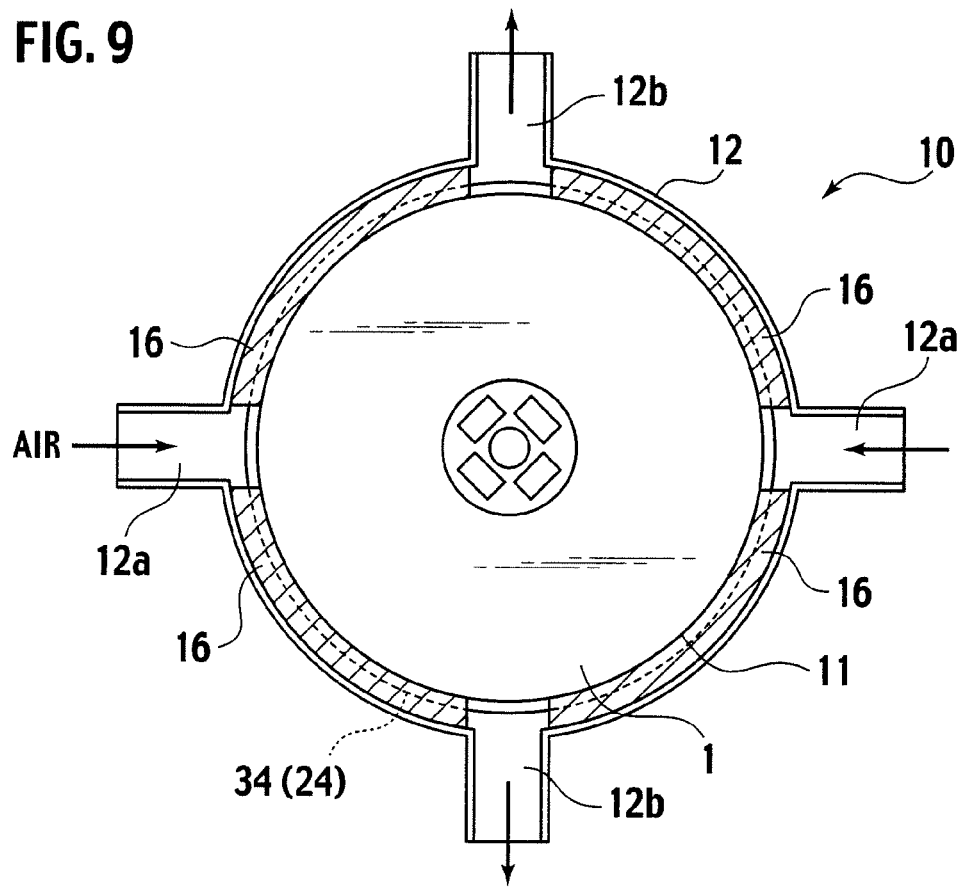
FIG. 9 is a plan view in a state where an upper surface of a casing and the uppermost current collector are removed, showing another modification example of the casing.
Figure 10:
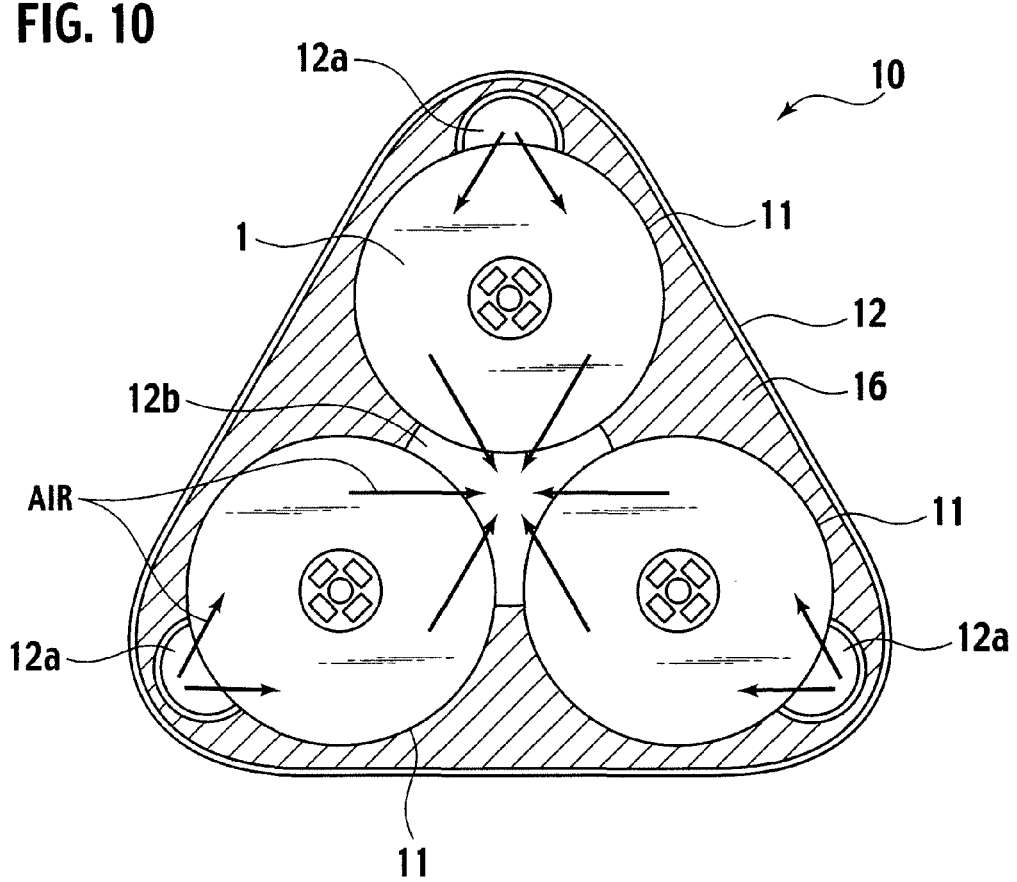
FIG. 10 is a plan view in a state where the upper surfaces of the casing and the uppermost current collectors are removed, showing a state where a plurality of the stack structures are housed in the casing.

This embodiment shows the casing where the number of each of the gas introduction portion 12a and the gas discharge portion 12b is set at one, however, the present invention is not limited to this. For example, as shown in FIG. 9, two gas introduction portions 12a and two gas discharge portions 12b may be disposed on the casing 12. Moreover, this embodiment shows the casing where the stack structure 11 of which number is one is housed, however, the present invention is not limited to this, either. For example, as shown in FIG. 10, a construction may be adopted, in which three stack structures 11 are housed in the casing 12 which forms an approximately triangle shape and has three gas introduction portions 12a and one gas discharge portion 12b.

Figure 11:
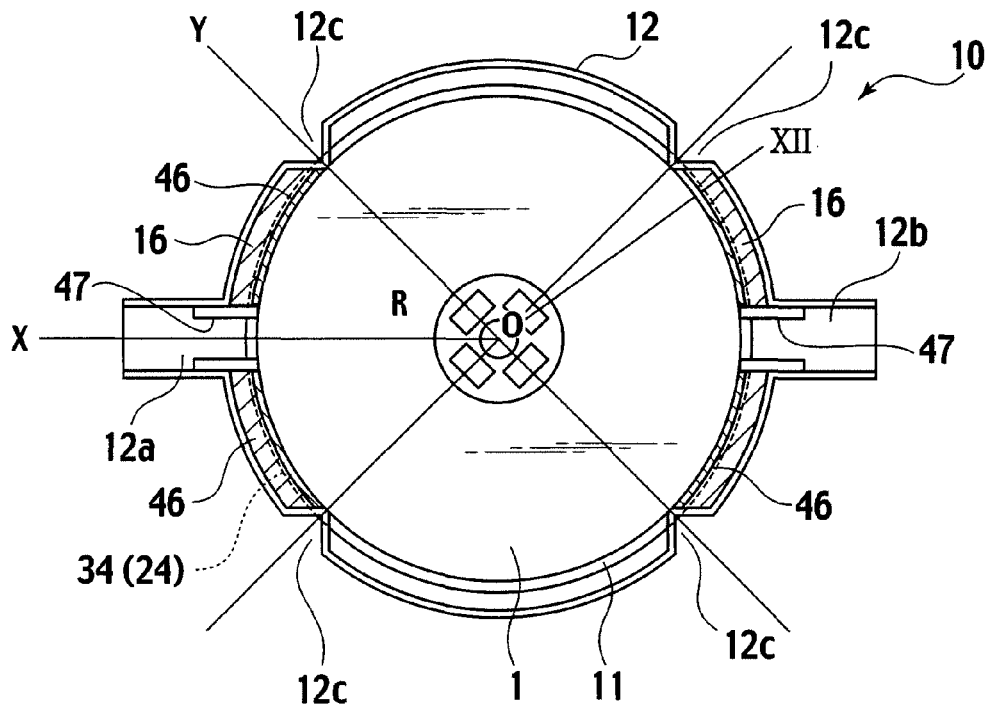
FIG. 11 is a plan view in a state where the upper surface of the casing and the uppermost current collector are removed, showing another embodiment of the fuel cell according to the present invention.
Figure 12:
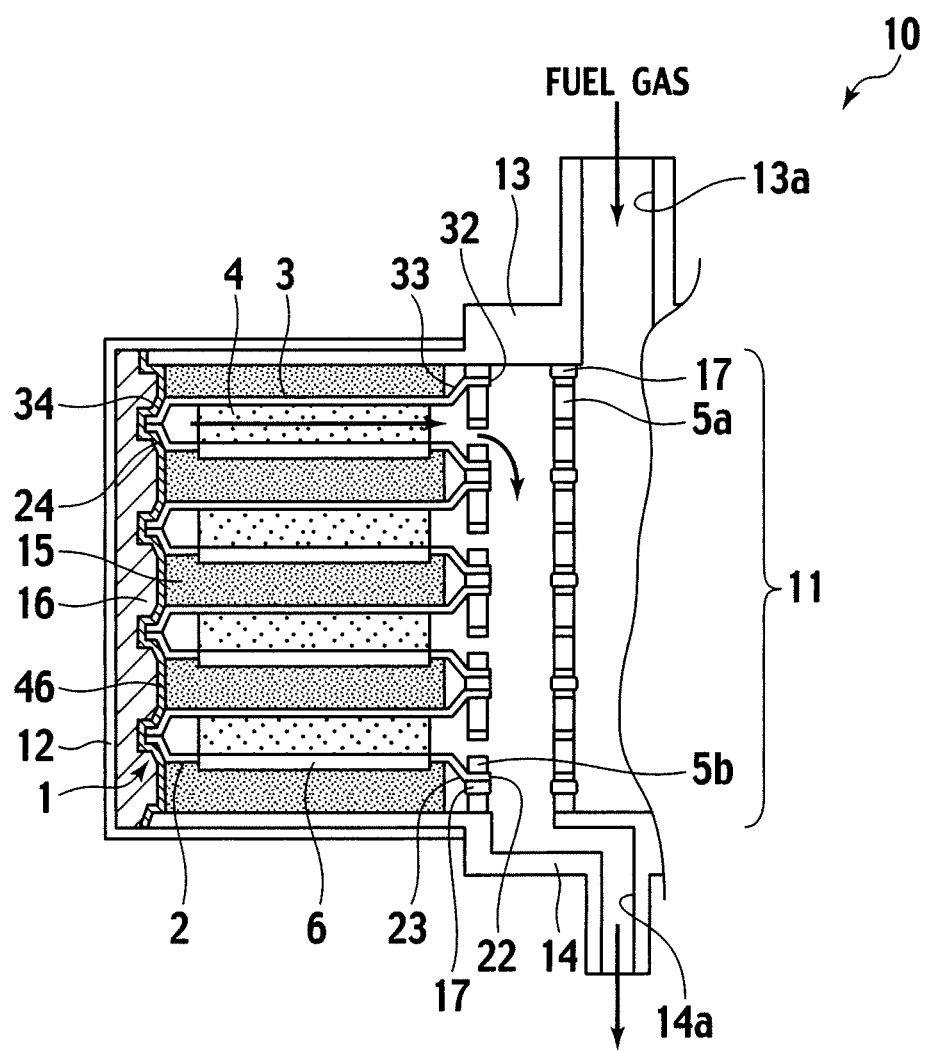
FIG. 12 is a cross-sectional view showing the fuel cell of another embodiment, taken along a line XII-O of FIG. 11.

FIG. 11 to FIG. 13B show another embodiment of the fuel cell according to the present invention. As shown in FIG. 12, in the fuel cell 10 of this embodiment, the gas flow-regulating member is composed by coating the filler material 16 made of the foaming cement onto a sheet material 46 made of a felt sheet. The sheet material 46 is located on the stack structure 11 side, mainly contains glass fiber, has electrically insulating property, and has a thickness of 0.1 mm. Moreover, the sheet material 46 and the filler material 16 are provided only in the vicinity of the gas introduction portion 12a and the vicinity of the gas discharge portion 12b in the gap.

Figure 13A:
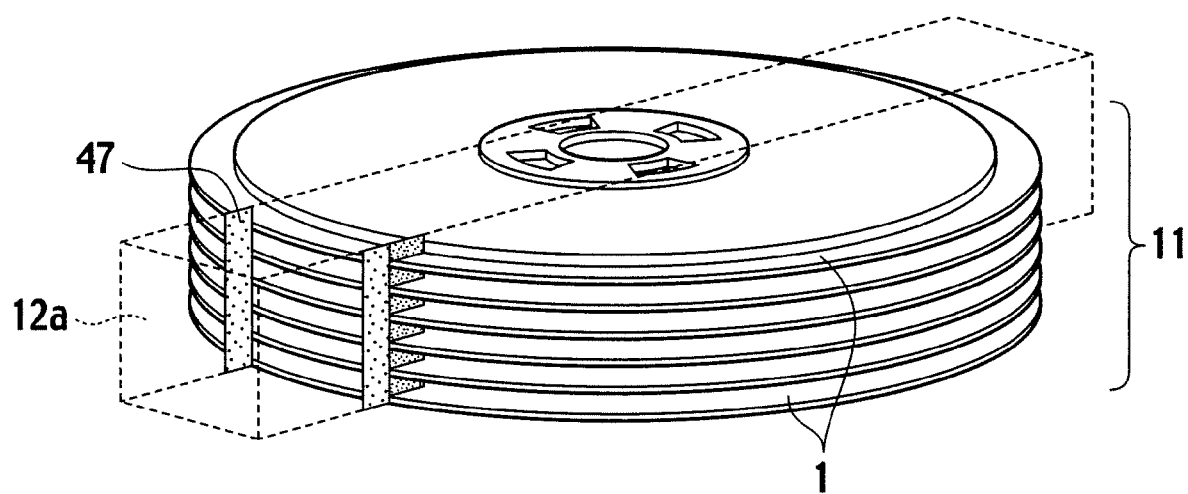
FIG. 13A is a perspective view showing a part of the fuel cell in FIG. 11.
Figure 13B:
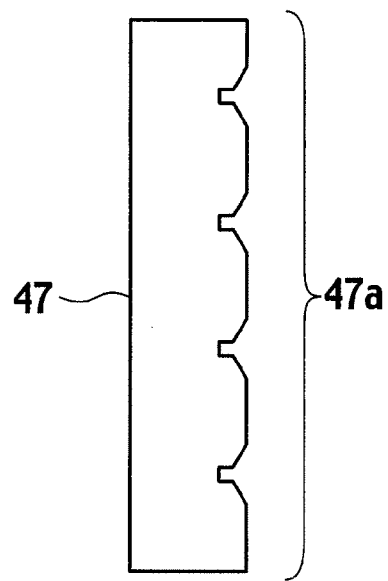
FIG. 13B is a front view showing a partition wall.

Moreover, as shown in FIG. 11, the casing 12 of the fuel cell 10 includes recessed portions (positioning/holding structures) 12c toward the stack structure 11 side on four spots of an outer peripheral wall thereof. Furthermore, as shown in FIG. 13A and FIG. 13B, the casing 12 includes partition walls (partition members) 47 which are located between the gas introduction portion 12a (gas discharge portion 12b) and the stack structure 11. The partition walls 47 have irregular portions 47a engaged with the outer periphery of the stack structure 11.

Each of the recessed portions 12c is arranged on a region where an angle R made by a line O-Y which connects the recessed portion 12c and the center O of the fuel cell units 1 to each other and by a line X-O which connects the center X of the gas introduction portion 12a (gas discharge portion 12b) and the center O of the fuel cell units 1 to each other becomes approximately 45°. Moreover, the above-described sheet material 46 and the filler material 16 are provided only between the recessed portion 12c and the partition walls 46.

In the fuel cell 10 of this embodiment, the sheet material 46 and the filler material 16 which serve as the gas flow-regulating member are provided between the stack structure 11 and the casing 12. Therefore, it becomes easier for the air introduced from the gas introduction portion 12a to flow through the current collectors 15 between the fuel cell units 1 than through the gap between the casing 12 and the stack structure 11. Therefore, the air supply amount to the cells 6 held by the cell plate 2 will be increased to a great extent. Hence, the sufficient generated power can be obtained.

In the above-described fuel cell 10, the gas flow-regulating member is composed by coating the filler material 16 made of the foaming cement onto the sheet material 46 which is located on the stack structure 11 side and has the electrically insulating property. Therefore, the filler material 16 and the fuel cell units 1 are inhibited from being adhered and fused to each other, and the thermal shock resistance of the fuel cell units 1 will be improved. In addition, it becomes possible to improve electrically insulating property between the fuel cell units 1 or between the fuel cell units 1 and the casing 12. As a result, a leakage loss is restricted, leading to the improvement of the power generation efficiency.

Moreover, in the above-described fuel cell 10, the sheet material 46, which is made of the felt sheet with a small porosity, is provided only in the vicinity of the gas introduction portion 12a and the vicinity of the gas discharge portion 12b. Specifically, the sheet material 46, in which thermal conductivity is high and weight is large, is disposed restrictively to the minimum necessary amount. Accordingly, a weight reduction and a heat capacity reduction in the fuel cell 10 are achieved. In addition, since the sheet material 46 is disposed a little, heat radiation from the casing 12 is restricted, thus making it possible to improve heat insulating performance thereof. Accordingly, it becomes easier to keep the stack structure 11 warm, and the power generation efficiency will be further improved.

Furthermore, in the above-described fuel cell 10, the partition walls 47 are provided between the gas introduction portion 12a (gas discharge portion 12b) and the stack structure 11. Thus, it becomes possible to avoid that the filler material 16 will hang out to the gas introduction portion 12a (gas discharge portion 12b) side, thereby hindering the flow of the gas.

Figure 14:
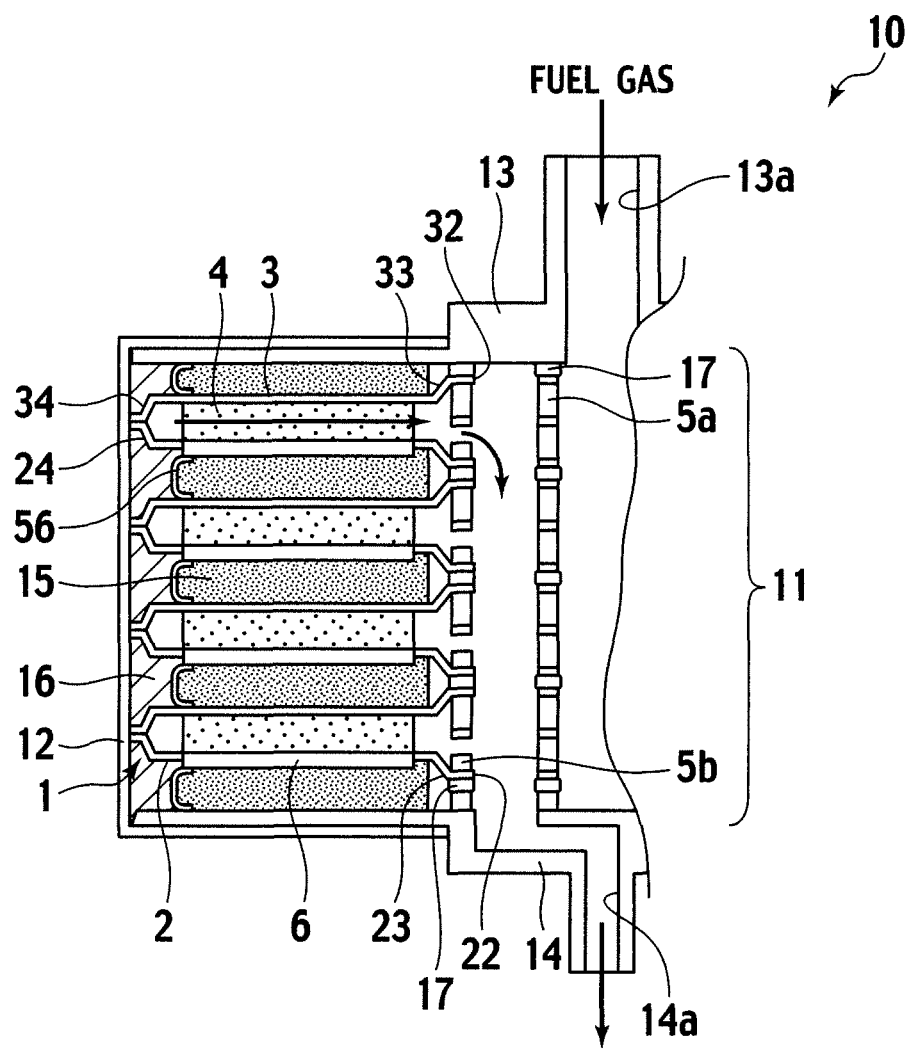
FIG. 14 is a cross-sectional view showing a part of the fuel cell in FIG. 11.

In the fuel cell 10 of this embodiment, the gas flow-regulating member is composed by coating the filler material 16 made of the foaming cement onto the sheet material 46 made of the felt sheet which is located on the stack structure 11 side and has the electrically insulating property. However, the present invention is not limited to this. For example, as shown in FIG. 14, the gas flow-regulating member may be composed in such a manner that a periphery of each current collector 15 between the fuel cell units 1 is covered with a sheet material 56 made of metal foil and that the filler material 16 is coated on each sheet material 56. With such a construction, in such a case where the filler material 16 is filled between the casing 12 and the stack structure 11, it becomes possible to inhibit the filler material 16 from entering pores of the current collectors 15. In addition, as described above, if the member with a small porosity, such as the ceramic felt sheet and the metal foil, is used for the sheet material located on the stack structure 11 side, then a porosity of the filler material injected or coated between the casing 12 and the stack structure 11 can be increased. Therefore, the improvement of the heat insulating performance and the weight reduction are achieved. In addition, cracks are difficult to enter the filler material against the thermal shock, and even if the cracks enter, the decrease of the gas flow regulating performance will be avoided.

Figure 15A:
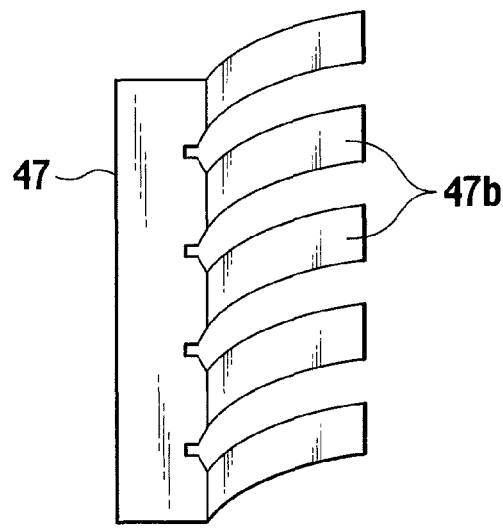
FIGS. 15A and 15B are schematic views showing modification examples of the partition wall.
Figure 15B:
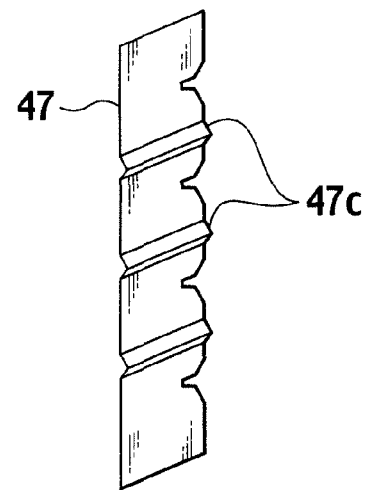

Moreover, in the fuel cell 10 of this embodiment, the partition walls 47 are provided between the gas introduction portion 12a (gas discharge portion 12b) and the stack structure 11. However, for example, as shown in FIG. 15A, baffle members 47b can be provided integrally with each partition wall 47. Further, as shown in FIG. 15B, buffer portions 47c can be provided by bending each partition wall 47.

When the baffle members 47b are provided integrally with the partition wall 47, on the gas introduction portion 12a side, the air introduced therefrom can be flown smoothly through the current collectors 15. Moreover, on the gas discharge portion 12b side, the air which has passed through the current collectors 15 can be guided smoothly to the gas discharge portion 12b. As a result, it becomes possible to easily distinguish the gas introduction portion 12a and the gas discharge portion 12b, of which pressure losses are desired to be reduced, and the region with a small porosity, of which pressure loss is desired to be increased.

Meanwhile, when the buffer portions 47c are provided on the partition wall 47, it is possible to absorb a large resonance of the peripheral edge portions of the fuel cell units 1 owing to mechanical vibrations of the fuel cell 10, and accordingly, excellent durability is brought.

Figure 16A:
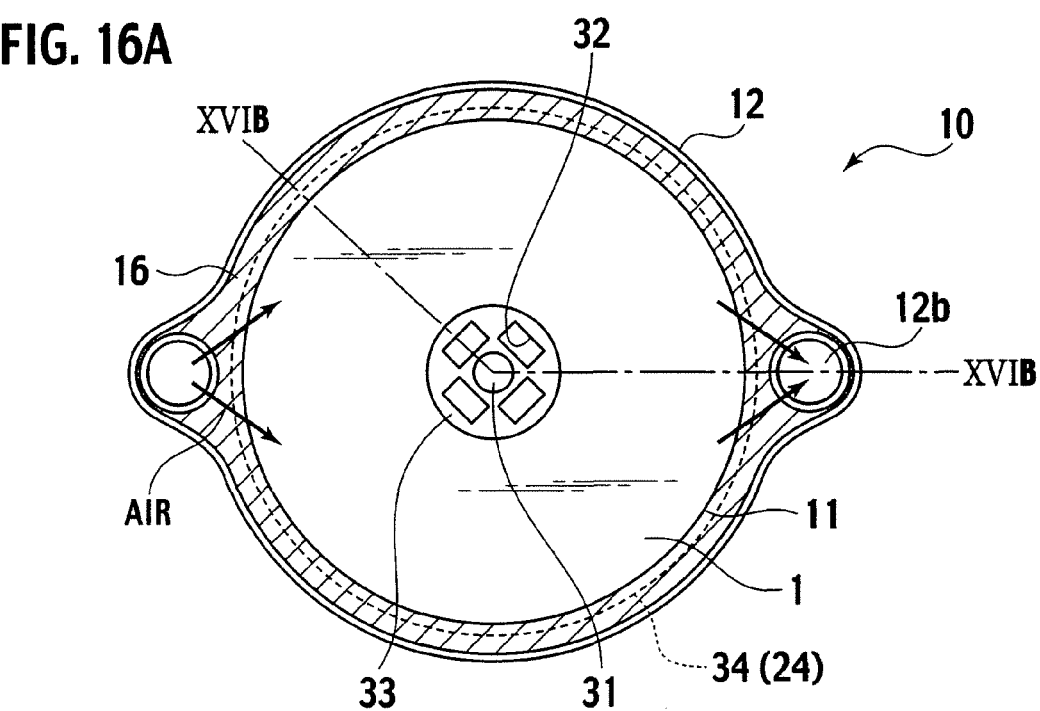
FIG. 16A is a plan view in a state where the upper surface of the casing and the uppermost current collector are removed, showing a still another embodiment of the fuel cell according to the present invention.
Figure 16B:
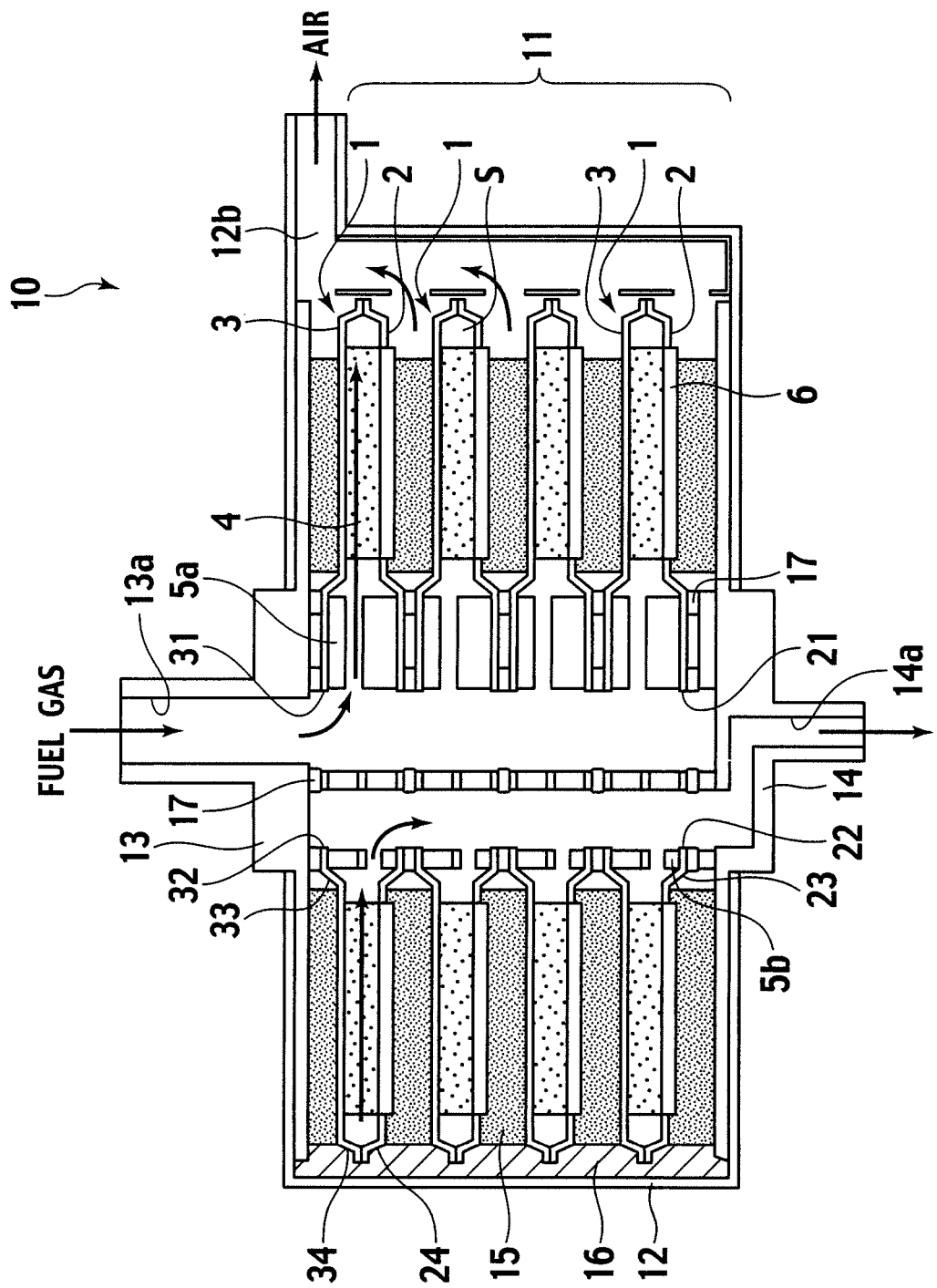
FIG. 16B is a cross-sectional view showing the fuel cell of the still another embodiment, taken along a line XVIB-XVIB of FIG. 16A.

FIG. 16A and FIG. 16B show still another embodiment of the fuel cell according to the present invention. As shown in FIG. 16A and FIG. 16B, as the gas flow-regulating member provided in the gap between the stack structure 11 and the casing 12, a molded body 66 matched with the shape of the gap is used. The molded body 66 is composed by performing stamp molding for felt into a semi-annular shape so that the felt can be matched with the outer diameter of the fuel cell units 1. In this case, the felt is formed by mixing an organic binder into alumina fiber and mica powder which are main components. The molded body 66 has steps each of which has a thickness equivalent to an interval between the fuel cell units 1. The step is formed by a hot-press machine so as to be matched with the outer peripheral edge of the fuel cell unit 1.

Moreover, in the fuel cell 10, the casing 12 forms a cylindrical shape which has the flange 14 fixed to a bottom portion thereof and is open at an upper end thereof, and the gas introduction portion 12a and the gas discharge portion 12b are located on such an opening portion at the upper end. Moreover, the stack structure 11 is inserted into the casing 12 from the upper end opening thereof in a state where the molded body 66 which forms the semi-annular shape is set between the fuel cell units 1. The casing 12 which houses the stack structure 11 therein is hermetically sealed by welding the flange 13 and a top cover to the upper end opening.

Figure 17:
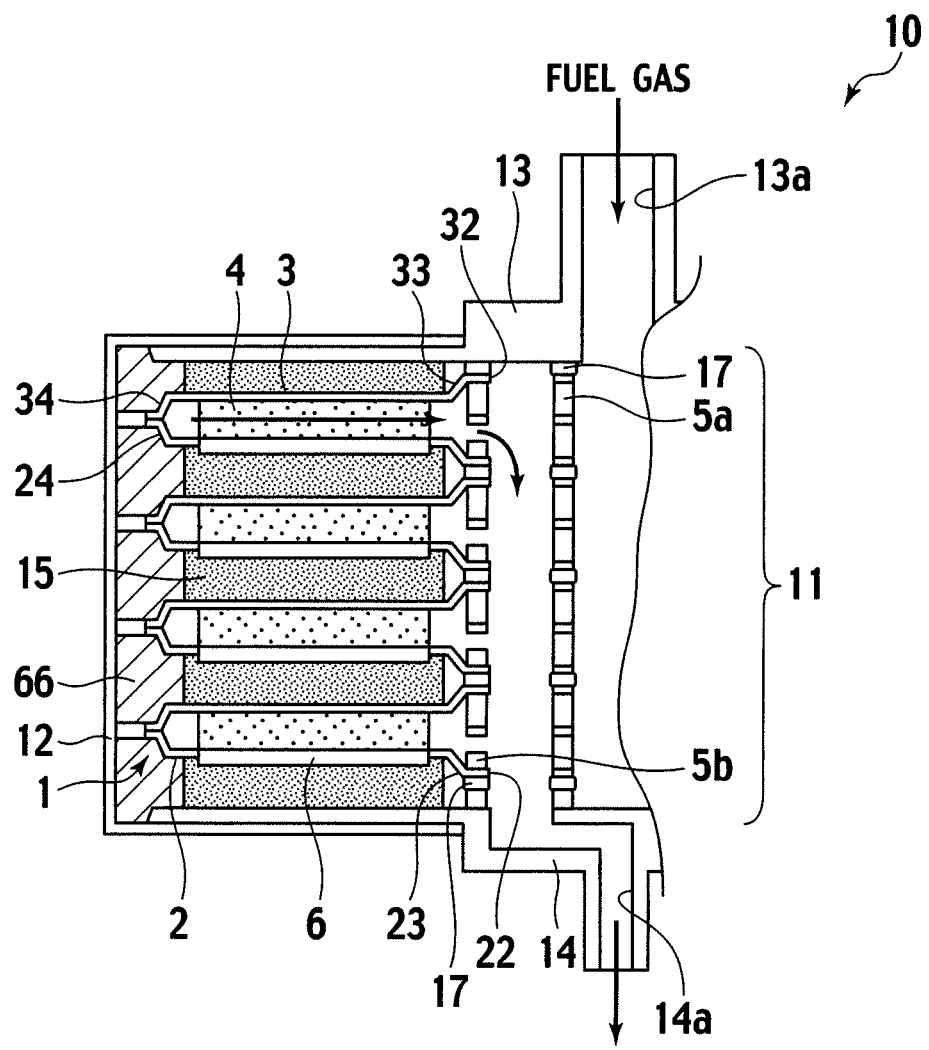
FIG. 17 is a partial cross-sectional view showing a state after burning off an organic component of a molded body as the gas flow-regulating member in the fuel cell of FIG. 16A.

In this embodiment, a heat treatment is performed for the fuel cell 10 while introducing the air into the casing 12, thereby burning off the organic component of the molded body 66 set in the ring shape between the fuel cell units 1. Thus, elasticity of the felt which constructs the molded body 66 is recovered, and as shown in FIG. 17, gaps surrounded by the fuel cell units 1, the current collectors 15 and the casing 12 are filled.

In the fuel cell 10 of this embodiment, in the gap between the stack structure 11 and the casing 12, the molded body 66 matched with the shape of the gap is provided. Therefore, it becomes easier for the air introduced from the gas introduction portion 12a to flow through the current collectors 15 than through the gap. Hence, the air supply amount to the cells 6 held by the cell plates 2 will be increased to a great extent, resulting in that the sufficient generated power can be obtained. Moreover, in the fuel cell 10 of this embodiment, the molded body 66 matched with the shape of the gap is used as the gas flow-regulating member. Therefore, it becomes possible to constantly maintain the interval between the stacked fuel cell units 1. As a result, it is possible to evenly flow, through the respective layers of the fuel cell units 1, the air introduced into the casing 12, resulting in an improvement of an output density.

Figure 18:
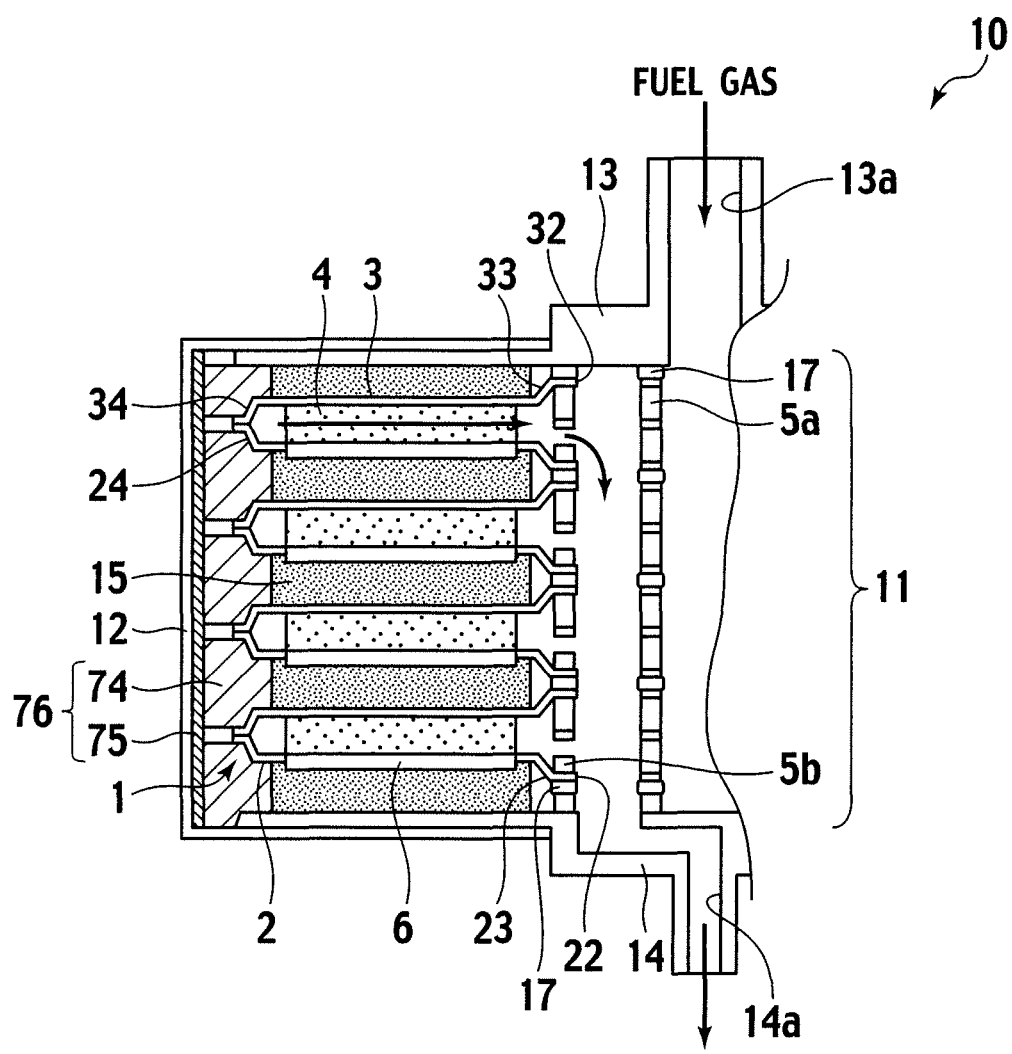
FIG. 18 is a partial cross-sectional view showing another modification example of the fuel cell in FIG. 16A.

In this embodiment, the molded body 66 which forms the semi-annular shape is set between the fuel cell units 1. However, as shown in FIG. 18, a felt mat 74 which is stacked on a felt sheet 75 to be then integrated therewith is used as the gas flow-regulating member. An integrated sheet material 76 composed of the felt mat 74 and the felt sheet 75 has horizontal stripe-like irregularities formed by press-molding a portion of the felt mats 74 so that the portion can be matched with the outer peripheral edge shape of the fuel cell units 1. In this case, the integrated sheet material 76 can be formed so as to be wrapped around the outer peripheral portion of the stack structure 11 and to be housed in the casing 12. Thus, it becomes possible to simply form the gas flow-regulating member and to simply install the gas flow-regulating member onto the stack structure 11.

In this case, a ceramic adhesive of a room temperature curing type may be coated on the horizontal stripe-like irregularities of the integrated sheet material 76, with which the inter-unit current collectors 15 are brought into contact, followed by solidification. With providing the ceramic adhesive, it becomes possible to form a layer with a smaller porosity at a position where surfaces of the felt mats 74 and the current collectors 15 are brought into contact with each other.

Figure 19:
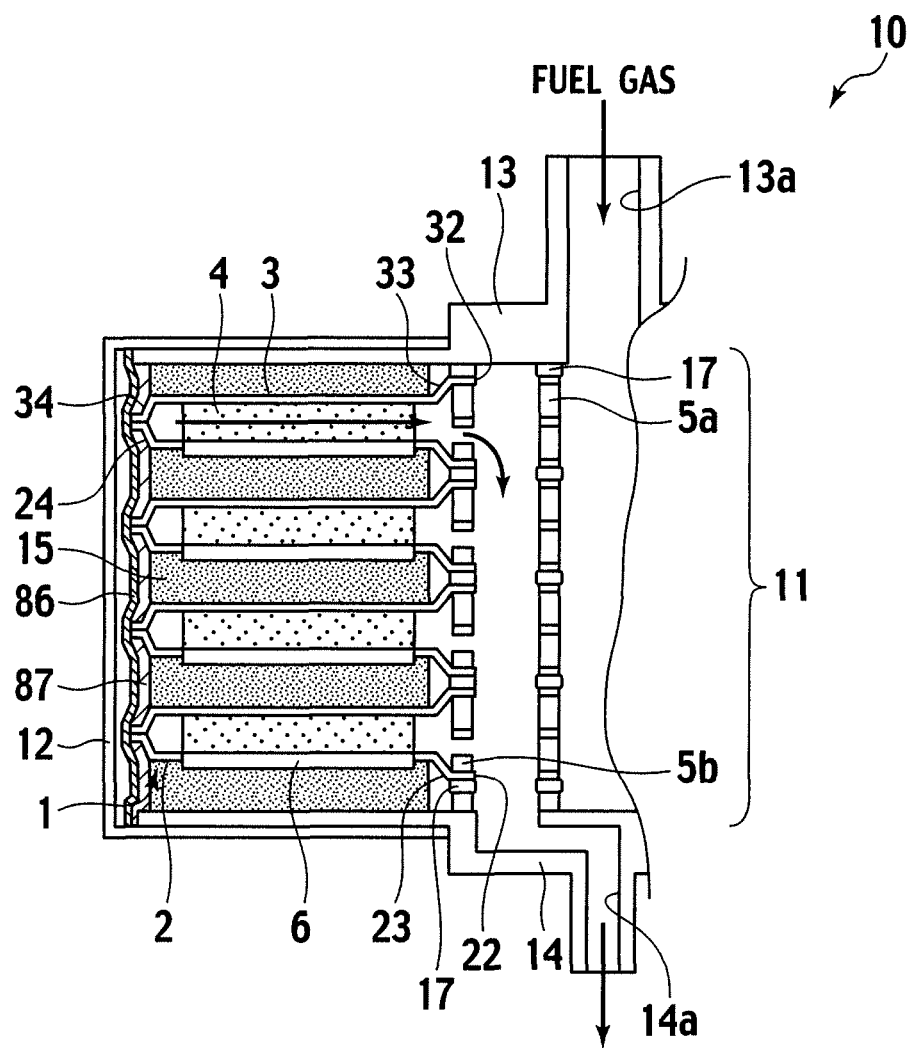
FIG. 19 is a partial cross-sectional view showing still another modification example of the fuel cell in FIG. 16A.

Moreover, in this embodiment, the molded body 66 which forms the semi-annular shape is set between the fuel cell units 1, thereby constantly maintaining the interval between the stacked fuel cell units 1. However, as shown in FIG. 19, another construction can be adopted, in which the gas flow-regulating member is formed of a wavy thin plate (spacer) 86 and a filler material 87 which are for constantly maintaining the interval between the fuel cell units 1. In this case, it is possible to maintain the interval between the fuel cell units 1. Accordingly, it becomes possible to prevent the outer peripheral edges of the fuel cell units 1 from resonating to a large extent with the mechanical vibrations of the fuel cell 10. Hence, excellent durability is brought.

Furthermore, in this embodiment, the molded body 66 is set between the fuel cell units 1 of the stack structure 11 over the entire peripheries thereof. However, as shown in FIG. 20, the partition walls 47 (refer to FIG. 15A) which integrally have the baffle members 47b as less porous portions of the gas flow-regulating member can be arranged in the vicinity of the gas introduction portion 12a and the vicinity of the gas discharge portion 12b.

In this case, it is preferable that the angle R made by the line X-O which connects the center X of the gas introduction portion 12a (gas discharge portion 12b) and the center O of the fuel cell units 1 to each other and by the line O-Y which connects the center O of the fuel cell units 1 and a terminal end of the baffle members 47b of each partition wall 47 be set to at least 15°. Moreover, it is preferable that the baffle members 47b be brought into contact with the current collectors 15, and that the partition walls 47 be made adjacent to the gas introduction portion 12a (gas discharge portion 12b). Thus, the baffle members 47 which are highly conductive and heavy are restricted to the minimum necessary, and the weight reduction and the heat capacity reduction in the fuel cell 10 will be achieved. In addition, the heat radiation from the casing 12 is restricted, thus making it possible to improve the heat insulating performance thereof. Accordingly, it becomes easy to keep the stack structure 11 warm, and the power generation efficiency will be improved.

Figure 21:
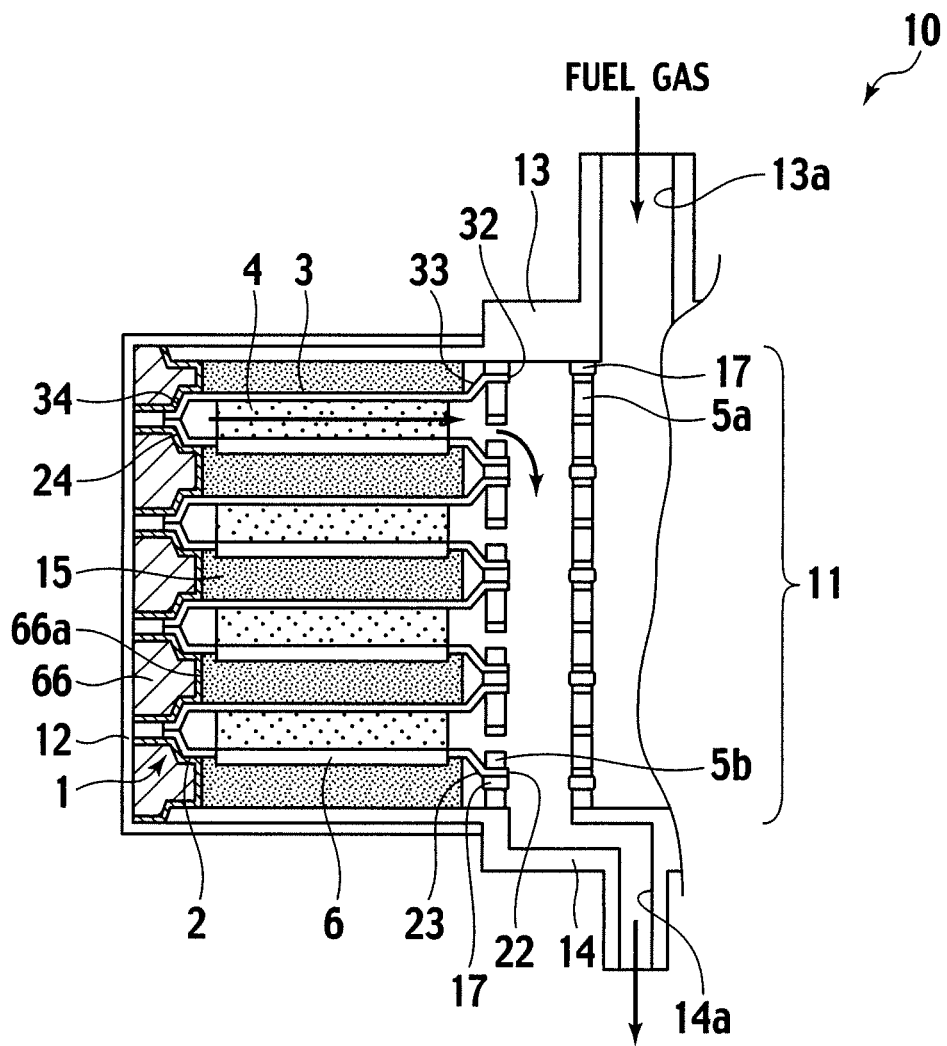
FIG. 21 is a partial cross-sectional view showing yet another modification example of the fuel cell in FIG. 16A.

Moreover, it is preferable that a porosity of a portion of the gas flow-regulating member, which is located on the casing 12 side, be set larger than a porosity of a portion thereof, which is located on the stack structure 11 side. As shown in FIG. 21, it is preferable to form a dense surface layer 66a with a small porosity in such a manner that, when the molded body 66 matched with the shape of the gap between the casing 12 and the stack structure 11 is used as the gas flow-regulating member, the ceramic-based adhesive is coated on the outer peripheral surface of the molded body 66, followed by the solidification. Thus, the weight reduction and the heat capacity reduction in the fuel cell 10 will be achieved.

Figure 22:
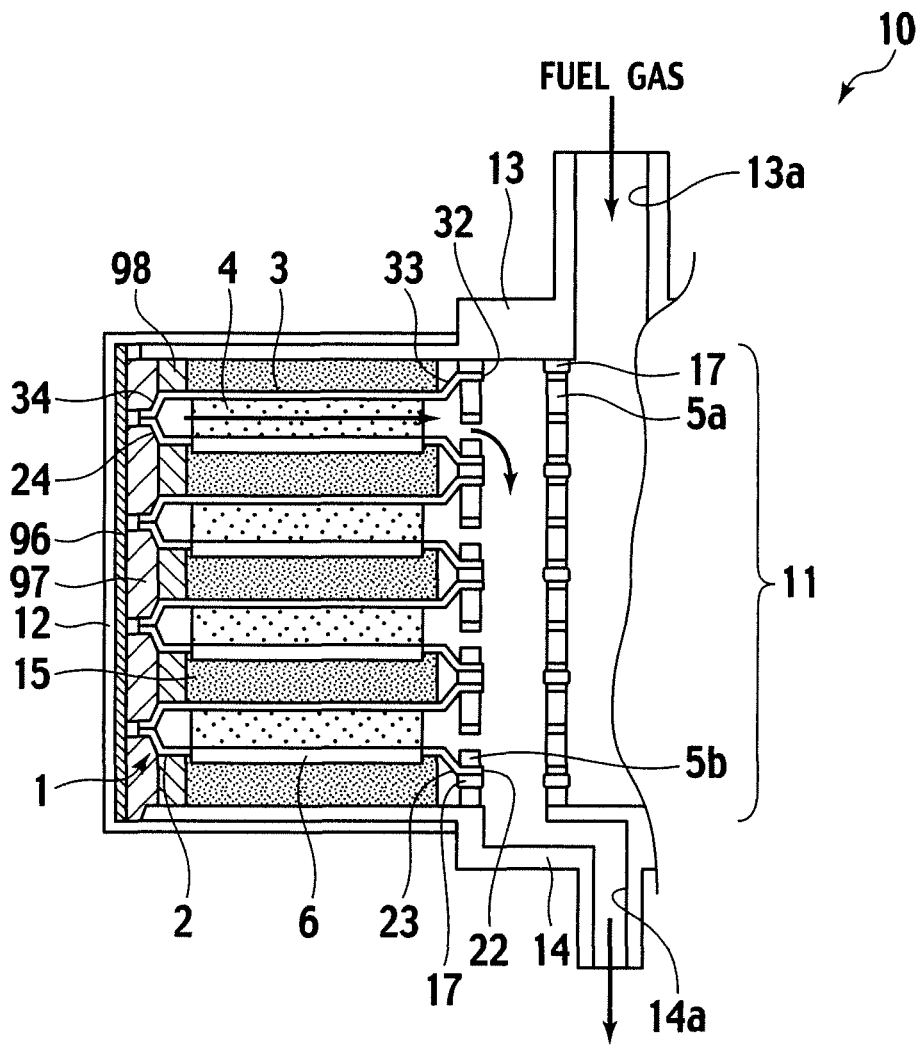
FIG. 22 is a partial cross-sectional view showing still yet another modification example of the fuel cell in FIG. 16A.

Furthermore, as shown in FIG. 22, a construction example to partially change the porosity of the gas flow-regulating member can be composed in such a manner that a sheet material 96 coated with a gel filler material 97 is wrapped around the stack structure 11, the filler material 97 is solidified, and then the stack structure 11 is housed in the casing 12. In this case, the construction may be composed so as to stack a filler material 98 with a smaller porosity than that of the filler material 97 of the sheet material 96 thereon. If the construction is composed so as to pattern plural layers of the filler materials different in porosity from each other on the sheet material 96, then it becomes possible to simply control the porosity of the gas flow-regulating member. As described above, if the filler materials different in porosity from each other are stacked into desired patterns by a printing technology, then it becomes possible to cope with a complicated peripheral shape of the stack structure.

Figure 23:
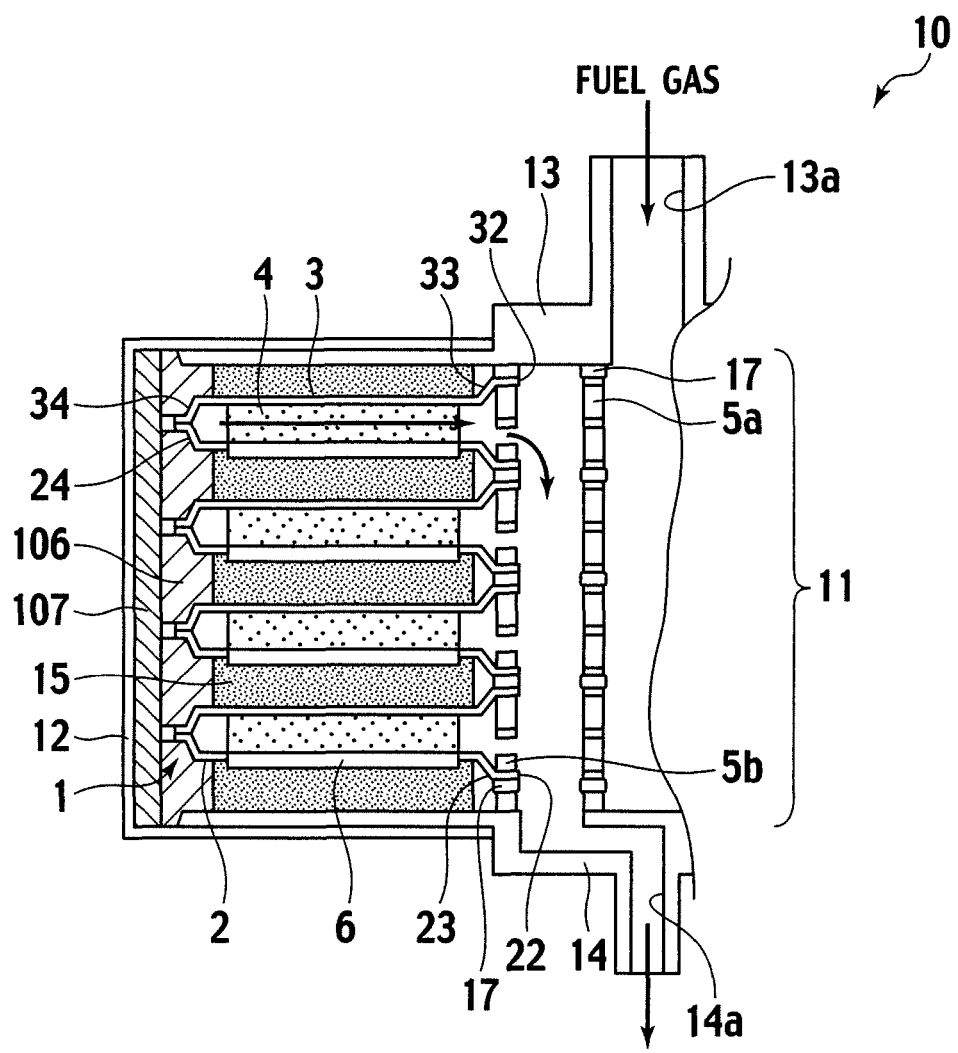
FIG. 23 is a partial cross-sectional view showing another modification example of the fuel cell in FIG. 16A.

Moreover, as shown in FIG. 23, a construction example to partially change the porosity of the gas flow-regulating member can be composed so as to dispose a molded body 107 with a large porosity on the outside of the molded body 106 with a small porosity. In this case, the heat radiation from the casing 12 is restricted, thus making it easy to keep the stack structure 11 warm. As a result, the power generation efficiency will be improved. Note that it is also possible to replace both or either one of the above-described molded bodies 106 and 107 by the filler material.

Figure 24:
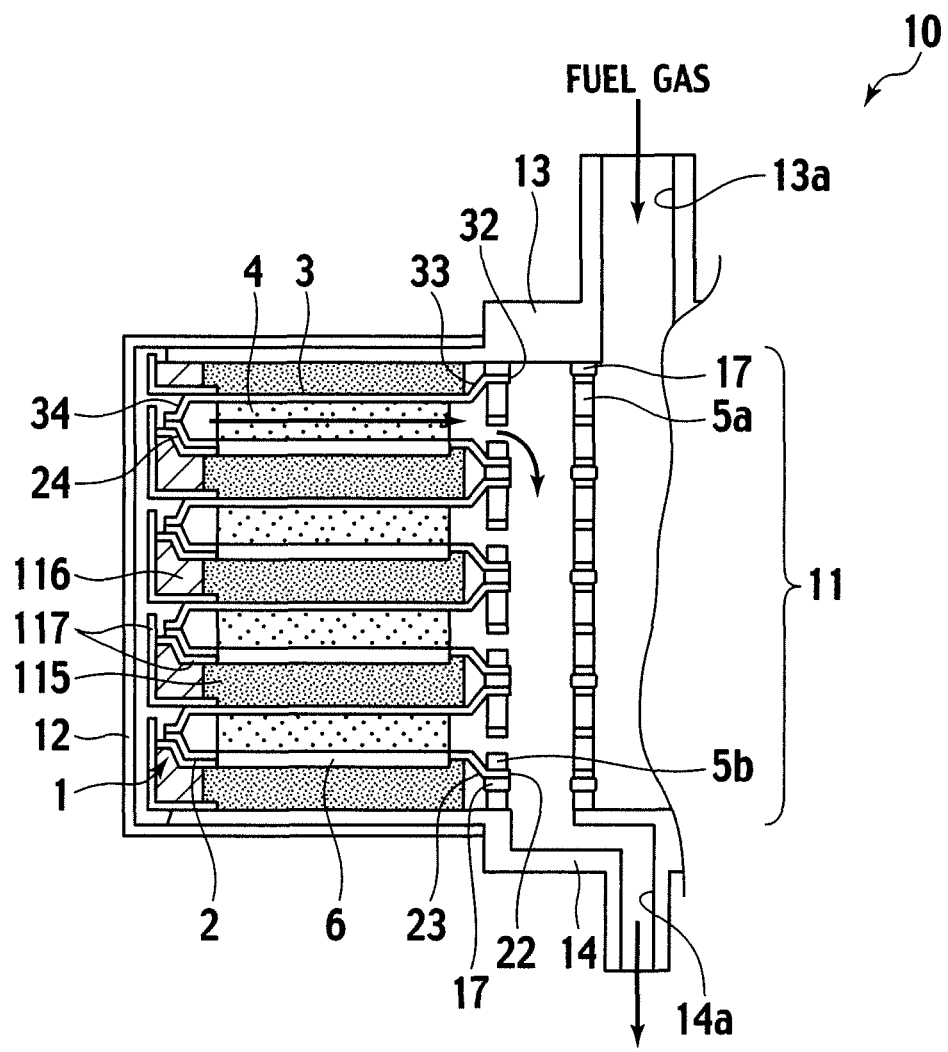
FIG. 24 is a partial cross-sectional view showing yet another embodiment of the fuel cell according to the present invention.

FIG. 24 shows yet another embodiment of the fuel cell according to the present invention. As shown in FIG. 24, in the fuel cell 10 of this embodiment, a portion of each current collector 115 on the casing 12 side is formed as a dense portion (gas flow-regulating member) 116 with a small porosity. The dense portion is capable of maintaining the interval between the fuel cell units 1. Moreover, electrically insulating members 117 formed of felt sheets made of glass fiber are interposed between the dense portions 116 and the fuel cell units 1 and between the dense portions 116 and the casing 12. Note that the dense portions 116 are not formed on portions of the current collectors 115, which are opposite to the gas introduction portion 12a and the gas discharge portion 12b.

In this case, knitted strings, which are made of metal fiber and arrayed into a doughnut shape, are formed to a desired thickness by hot-press molding, thereby forming the current collectors 115. Moreover, at a stage where the knitted strings are arrayed into the doughnut shape, the knitted strings are stacked and arranged more on outer peripheral portions of the current collectors 115 than on center portions thereof with which the cells 6 are brought into contact. Thus, the dense portions 116 with a small porosity are integrally formed on the outer peripheral portions of the current collectors 115.

Moreover, in the fuel cell 10, at a time of a step of stacking the fuel cell units 1, the electrically insulating members 117 are arranged on both surfaces and outer peripheral portions of the dense portions 116 of the current collectors 115. Subsequently, the fuel cell units 1 are stacked on one another while interposing the current collectors 115 therebetween to form the stack structure 1, and then the stack structure 11 is housed in the casing 12. Hence, in the fuel cell 10, it is possible to maintain the interval between the fuel cell units 1 by the dense portions 116 of the current collectors 115, and accordingly, assembly work thereof becomes easy.

In the fuel cell 10 of this embodiment, the dense portions 116 formed integrally with the current collectors 115 are arranged in the gap between the stack structure 11 and the casing 12. Therefore, it becomes easier for the air introduced from the gas introduction portion 12a to flow through the center portions of the current collectors 15 than through the gap between the casing 12 and the stack structure 11. Therefore, the air supply amount to the cells 6 held by the cell plate 2 will be increased to a great extent, and hence, the sufficient generated power can be obtained.

Figure 25:
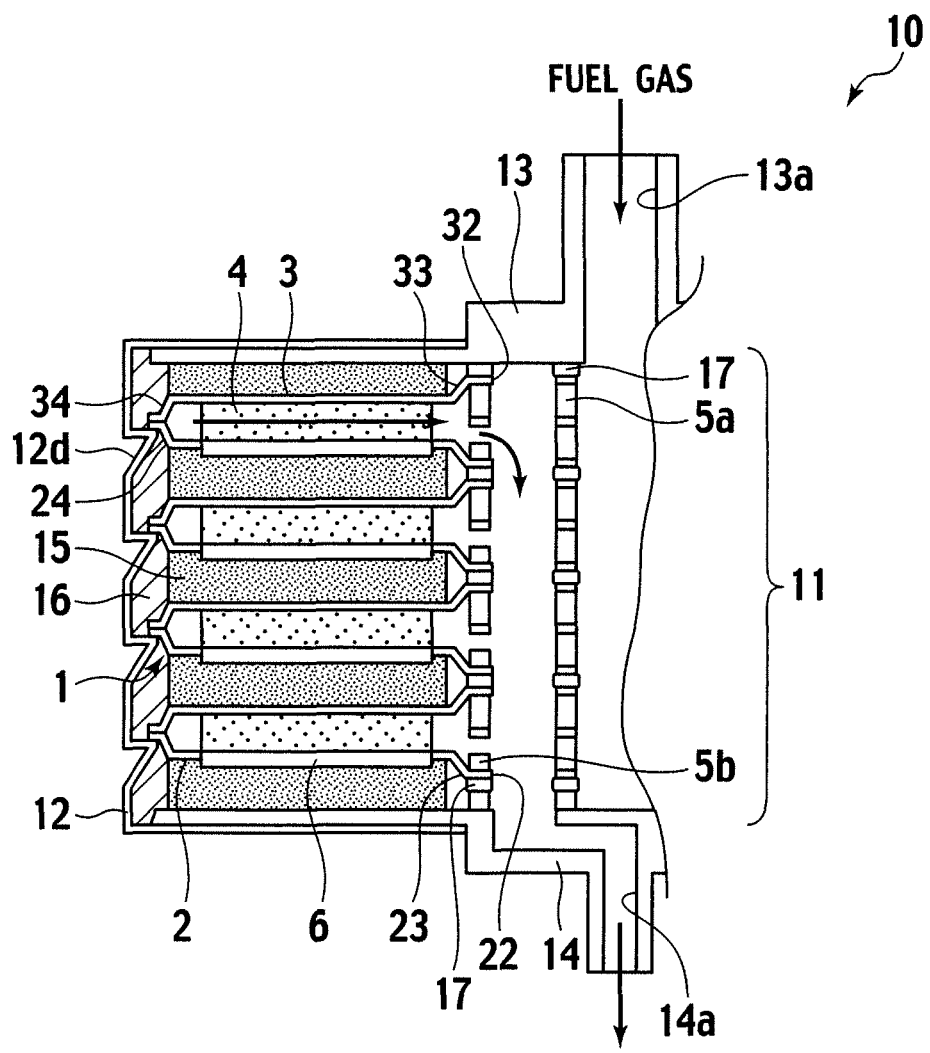
FIG. 25 is a partial cross-sectional view showing still yet another embodiment of the fuel cell according to the present invention.

FIG. 25 shows still yet another embodiment of the fuel cell according to the present invention. As shown in FIG. 25, in the fuel cell 10 of this embodiment, there is provided, in the casing 12, ratchet-like steps 12d as a positioning/holding structure. The ratchet-like steps 12d locate and hold the stack structure 11 at a predetermined region in the casing 12. Other constructions are the same as those of the fuel cell 10 in the previous embodiment shown in FIG. 1.

In the fuel cell 10 of this embodiment, it is possible to inhibit the outer peripheral edges of the fuel cell units 1 from resonating to a large extent owing to the mechanical vibrations of the fuel cell 10. Hence, excellent durability is brought.

Figure 26:
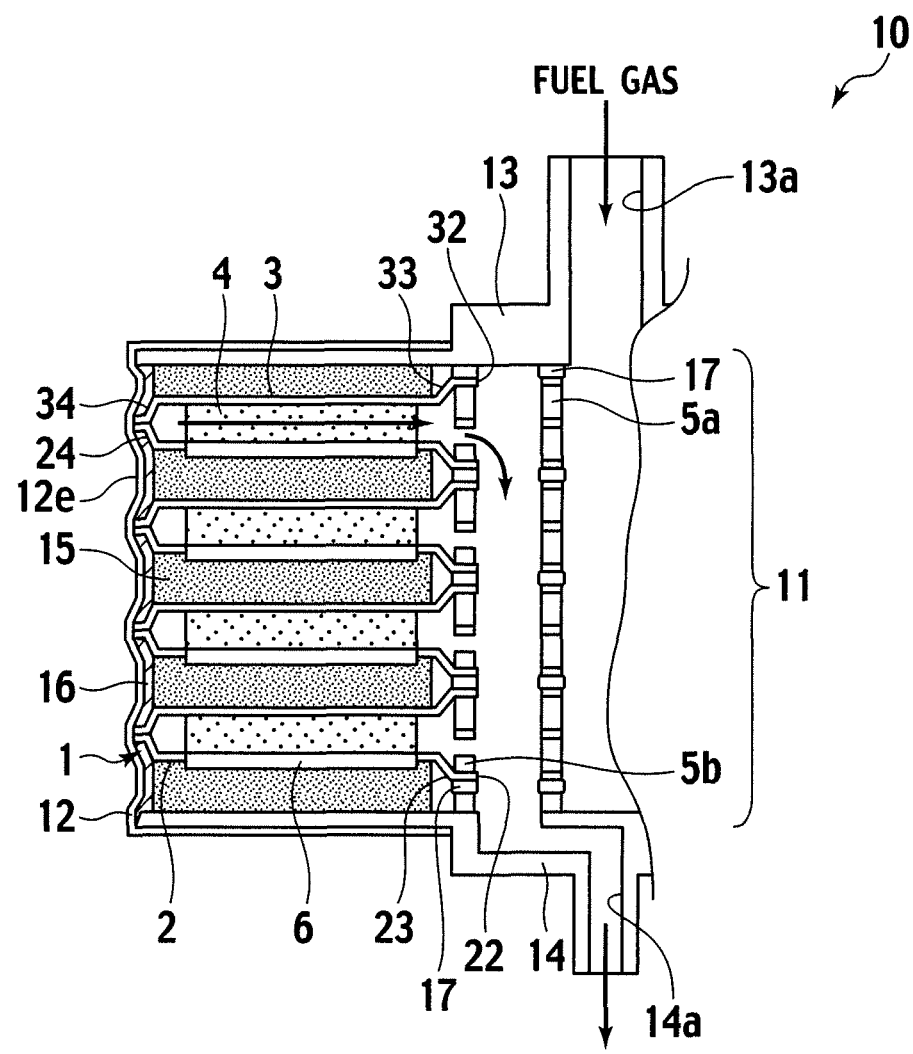
FIG. 26 is a partial cross-sectional view showing another modification example of the fuel cell in FIG. 25.
Figure 27:
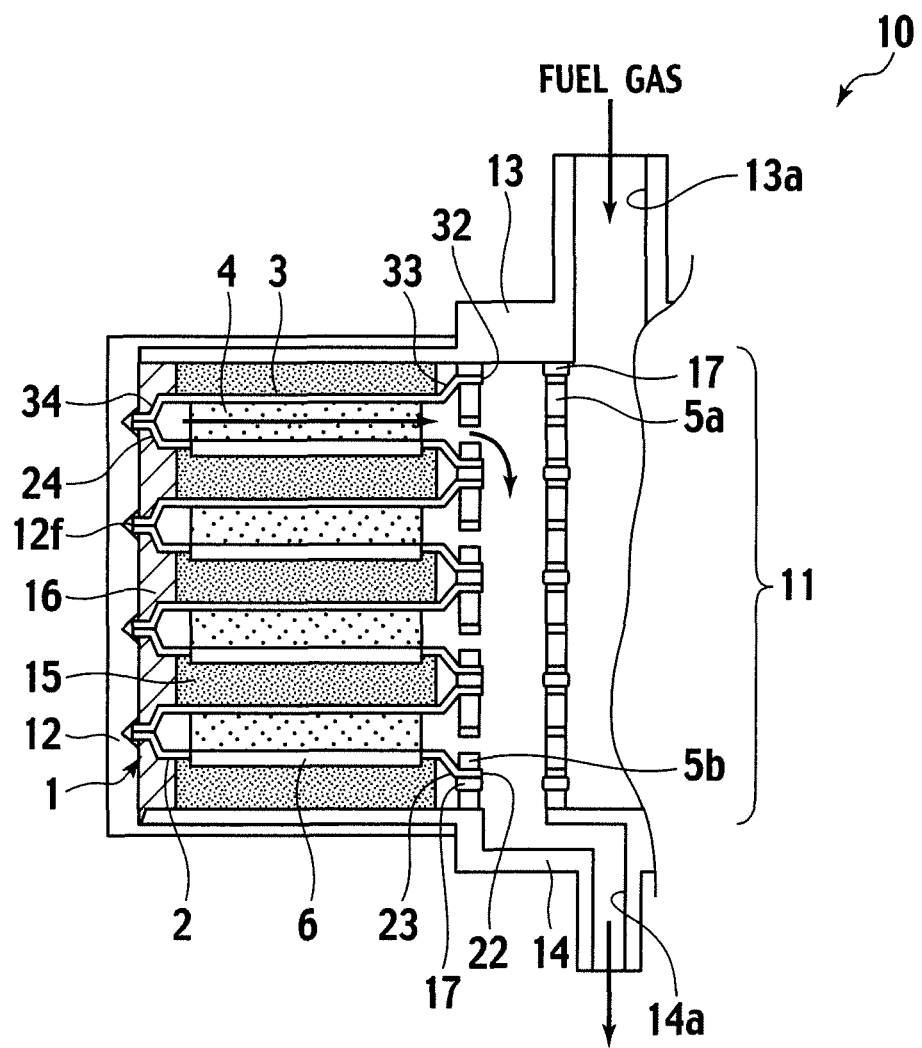
FIG. 27 is a partial cross-sectional view showing still another modification example of the fuel cell in FIG. 25.

This embodiment shows the casing where the ratchet-like steps 12d are used as the positioning/holding structure. However, the present invention is not limited to this. As shown in FIG. 26, another construction can be adopted, in which wavy steps 12e are used as the positioning/holding structure, and as shown in FIG. 27, still another construction can be adopted, in which wedge-shaped grooves 12f are used as the positioning/holding structure.

Moreover, this embodiment shows the casing where each of the ratchet-like steps 12d, the wavy steps 12e and the wedge-shaped grooves 12f is formed so as to correspond to all the fuel cell units 1. Specifically, the ratchet-like steps 12d, the wavy steps 12e and the wedge-shaped grooves 12f may be formed partially or entirely on the outer periphery of the casing 12, or may be formed to every plural fuel cell units 1.

As described above, the fuel cell according to the present invention is characterized in that the gas flow-regulating member is provided in the gap between the casing and the stack structure. Moreover, the gas flow-regulating member is formed of the highly porous material, thus making it possible to enhance the heat retaining property of the stack structure. However, the gas flow-regulating member can be formed of a material with a high heat radiation property. In this case, even if the stack structure is in an abnormally high temperature state, the stack structure can be cooled efficiently. As such a material, a material with high radiant efficiency and a material with high heat transfer efficiency can be used.

The entire content of a Japanese Patent Application No. P2005-337230 with a filing date of Nov. 22, 2005 is herein incorporated by reference.

Although the invention has been described above by reference to certain embodiments of the invention, the invention is not limited to the embodiments described above and modifications may become apparent to these skilled in the art, in light of the teachings herein. The scope of the invention is defined with reference to the following claims.

What is claimed is:

1. A fuel cell, comprising:
a stack structure composed by stacking a plurality of solid oxide fuel cell units with a first set of current collectors, the fuel cell units including: a cell plate which holds at least one cell and has a gas introduction hole for one of fuel gas and air in a center portion thereof; and a separator plate which has a gas introduction hole for the one of the fuel gas and the air in a center portion thereof and makes an outer peripheral edge thereof entirely and directly bonded to an outer peripheral edge of the cell plate such that a space in each fuel cell unit is formed, wherein a current collector from a second set of current collectors is disposed in the space, and wherein the space is configured to have the one of the fuel gas and the air flow therethrough;
a casing housing the stack structure, the casing including a gas introduction portion and a gas discharge portion, and the casing configured to introduce the other of the fuel gas and the air thereinto from the gas introduction portion and to guide the other of the fuel gas and the air to the gas discharge portion; and
a gas flow-regulating member provided in a gap between the casing and the stack structure and configured such that the other of the fuel gas and the air is guided to the gas discharge portion through the first set of current collectors located between the fuel cell units, and a flow of the other of the fuel gas and the air to the gap between the casing and the stack structure is prevented, and
wherein each of a subset of the current collectors from the first set of current collectors contacts both a cell plate of one of the fuel cell units and a separator plate of a fuel cell unit adjacent to the one of the fuel cell units.

2. A fuel cell according to claim 1, wherein a mold release agent is sprayed between the gas flow-regulating member and the fuel cell units during assembly such that the gas flow-regulating member and the fuel cell units are movable relative to each other.

3. A fuel cell according to claim 1, wherein the gas flow-regulating member is composed of a filler material disposed in the gap between the casing and the stack structure.

4. A fuel cell according to claim 1, wherein the gas flow-regulating member is composed of a molded body matched with a shape of the gap between the casing and the stack structure.

5. A fuel cell according to claim 1, wherein the gas flow-regulating member is composed by combining a sheet material located on a stack structure side and a filler material disposed on a casing side.

6. A fuel cell according to claim 1, wherein the gas flow-regulating member is composed by combining a sheet material and a molded body matched with a shape of the gap between the casing and the stack structure.

7. A fuel cell according to claim 1, wherein the gas flow-regulating member is composed by combining a spacer capable of maintaining an interval between the fuel cell units and a filler material.

8. A fuel cell according to claim 1, wherein a porosity of the gas flow-regulating member is set smaller than a porosity of the current collectors of the first set of current collectors.

9. A fuel cell according to claim 8, wherein the porosity of the gas flow-regulating member is changed by stacking plural layers having different porosities on each other.

10. The fuel cell according to claim 9, wherein the gas flow-regulating member has a first portion located on a casing side and a second portion on a stack structure side, wherein a porosity of the first portion is set larger than a porosity of the second portion.

11. A fuel cell according to claim 1, wherein the gas flow-regulating member and the fuel cell units are electrically insulated from each other.

12. A fuel cell according to claim 11, wherein a casing side portion of the current collectors from the first set of current collectors is formed as the gas flow-regulating member capable of maintaining an interval between the fuel cell units, and
wherein an electrically insulating member is interposed between the gas flow-regulating member and the fuel cell units.

13. A fuel cell according to claim 1, further comprising a partition member provided on the gas introduction portion and an end surface of the gas flow-regulating member adjacent to the gas introduction portion, or provided on the gas discharge portion and an end surface of the gas flow-regulating member adjacent to the gas discharge portion.

14. A fuel cell according to claim 13, wherein a first baffle member, which is configured to guide the other of the fuel gas and the air to the first set of current collectors, is provided integrally with the partition member provided on the gas introduction portion,
wherein a second baffle member is configured to guide the other of the fuel gas and the air after the other of the fuel gas and the air has passed through the first set of current collectors, and
wherein the second baffle member is provided integrally with another partition member provided on the gas discharge portion.

15. A fuel cell according to claim 1, further comprising a positioning/holding structure which is provided in the casing, and
wherein the positioning/holding structure locates and holds the stack structure at a predetermined region in the casing.

16. A fuel cell according to claim 1, wherein the separator plate makes the outer peripheral edge thereof entirely and directly contacted with and bonded to the outer peripheral edge of the cell plate.

17. A fuel cell according to claim 1, wherein the current collectors of the first set of current collectors are formed of a conductive porous body.

18. A fuel cell according to claim 1, wherein the subset of the current collectors is a plurality of current collectors.

19. A fuel cell according to claim 1, wherein the gas flow-regulating member comprises a foamed material.

20. A fuel cell, comprising:
a stack structure composed by stacking a plurality of solid oxide fuel cell units with a first set of current collectors, the fuel cell units including: a cell plate which holds at least one cell and has a gas introduction hole for one of fuel gas and air in a center portion thereof; and a separator plate which has a gas introduction hole for the one of the fuel gas and the air in a center portion thereof and makes an outer peripheral edge thereof entirely and directly bonded to an outer peripheral edge of the cell plate such that a space in each fuel cell unit is formed, wherein a current collector from a second set of current collectors is disposed in the space, and wherein the space is configured to have the one of the fuel gas and the air flow therethrough;
a casing housing the stack structure, the casing including a gas introduction portion and a gas discharge portion, and the casing configured to introduce the other of the fuel gas and the air thereinto from the gas introduction portion and to guide the other of the fuel gas and the air to the gas discharge portion; and
a gas flow-regulating member provided in a gap between the casing and the stack structure and configured such that the other of the fuel gas and the air is guided to the gas discharge portion through the first set of current collectors located between the fuel cell units,
wherein each of a subset of the current collectors from the first set of current collectors contacts both a cell plate of one of the fuel cell units and a separator plate of a fuel cell unit adjacent to the one of the fuel cell units,
wherein, after being assembled in the casing, the gas flow-regulating member and the fuel cell units are configured to be movable relative to each other, and
wherein a mold release agent is sprayed between the gas flow-regulating member and the fuel cell units during assembly such that the gas flow-regulating member and the fuel cell units are movable relative to each other.

21. A fuel cell, comprising:
a stack structure composed by stacking a plurality of solid oxide fuel cell units with a first set of current collectors, the fuel cell units including: a cell plate which holds at least one cell and has a gas introduction hole for one of fuel gas and air in a center portion thereof; and a separator plate which has a gas introduction hole for the one of the fuel gas and the air in a center portion thereof and makes an outer peripheral edge thereof entirely and directly bonded to an outer peripheral edge of the cell plate such that a space in each fuel cell unit is formed, wherein a current collector from a second set of current collectors is disposed in the space, and wherein the space is configured to have the one of the fuel gas and the air flow therethrough;
a casing housing the stack structure, the casing including a gas introduction portion and a gas discharge portion, and the casing configured to introduce the other of the fuel gas and the air thereinto from the gas introduction portion and to guide the other of the fuel gas and the air to the gas discharge portion; and
a gas flow-regulating member provided in a gap between the casing and the stack structure and configured such that the other of the fuel gas and the air is guided to the gas discharge portion through the first set of current collectors located between the fuel cell units,
wherein the gas flow-regulating member comprises a continuum of one porous material extending between an upper-most fuel cell unit to a bottom-most fuel cell unit in a vicinity of the gas introduction portion of the casing, and
wherein each of a subset of the current collectors from the first set of current collectors contacts both a cell plate of one of the fuel cell units and a separator plate of a fuel cell unit adjacent to the one of the fuel cell units.

* * * * *